(12) United States Patent
Weber et al.

(10) Patent No.: US 7,191,743 B2
(45) Date of Patent: Mar. 20, 2007

(54) AIR AND FUEL SUPPLY SYSTEM FOR A COMBUSTION ENGINE

(75) Inventors: James R. Weber, Lacon, IL (US); Scott A. Leman, Eureka, IL (US); Gerald N. Coleman, Corby (GB); Kevin P. Duffy, Metamora, IL (US); Eric C. Fluga, Dunlap, IL (US); Jonathan P. Kilkenny, Peoria, IL (US); Homa Afjeh, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/992,069

(22) Filed: Nov. 19, 2004

(65) Prior Publication Data

US 2005/0241611 A1 Nov. 3, 2005

Related U.S. Application Data

(63) Continuation-in-part of application No. 10/933,300, filed on Sep. 3, 2004, which is a continuation-in-part of application No. 10/733,570, filed on Dec. 12, 2003, which is a continuation of application No. 10/143,908, filed on May 14, 2002, now Pat. No. 6,688,280, said application No. 10/992,069 is a continuation-in-part of application No. 10/697,437, filed on Oct. 31, 2003, now Pat. No. 7,007,643.

(51) Int. Cl.
  *F01L 1/00* (2006.01)
  *F01L 3/00* (2006.01)
(52) U.S. Cl. .................... 123/90.11; 123/316

(58) Field of Classification Search ............ 123/90.11, 123/90.15, 90.16, 90.17, 90.18, 559.1, 562, 123/316, 563, 299, 305
See application file for complete search history.

(56) References Cited

U.S. PATENT DOCUMENTS 883,240 A 3/1908 Sabathe (Continued)

FOREIGN PATENT DOCUMENTS

AT 003 134 10/1999

(Continued)

OTHER PUBLICATIONS http://www.mazda.com.au/corpora/209.html, Oct. 16, 2001, pp. 1-6.

(Continued)

*Primary Examiner*—Mahmoud Gimie
(74) *Attorney, Agent, or Firm*—Finnegan, Henderson, Farabow, Garrett & Dunner

(57) ABSTRACT

In one aspect, the present disclosure is directed to an internal combustion engine having an engine block defining at least one cylinder and a head connected with said engine block. The head has an air intake port and an exhaust port. The internal combustion engine also has a piston and a combustion chamber. The internal combustion engine further has an air intake valve movable to open and close the air intake port and an air supply system having at least one turbocharger fluidly connected to the air intake port. The internal combustion engine additionally has a fuel supply system operable to inject fuel into the combustion chamber, a cam assembly selectively mechanically linked to the air intake valve to move the air intake valve, and an electromagnetic actuator configured to decouple the cam assembly from the air intake valve and control movement of the air intake valve.

55 Claims, 9 Drawing Sheets

U.S. PATENT DOCUMENTS

| | | |
|---|---|---|
| 982,251 A | 1/1911 | Coffee |
| 1,033,939 A | 7/1912 | Robb et al. |
| 1,316,977 A | 9/1919 | Ricardo |
| 1,562,692 A | 11/1925 | DeRochfort-Lucay |
| 1,610,888 A | 12/1926 | Sauer |
| 1,629,327 A | 5/1927 | Waldo |
| 1,781,147 A | 11/1930 | Zaikowsky |
| 1,825,817 A | 10/1931 | Patterson |
| 1,963,780 A | 6/1934 | DuBois |
| 2,126,616 A | 8/1938 | Cayabyab |
| 2,202,227 A | 5/1940 | Noland |
| 2,292,233 A | 8/1942 | Lysholm |
| 2,344,993 A | 3/1944 | Lysholm |
| 2,391,176 A | 12/1945 | Mallory |
| 2,400,247 A | 5/1946 | Miller et al. |
| 2,453,377 A | 11/1948 | Lozivit |
| 2,484,009 A | 10/1949 | Barber |
| 2,484,109 A | 10/1949 | Meinecke |
| 2,522,456 A | 9/1950 | Mallory |
| 2,594,845 A | 4/1952 | Baumann |
| 2,614,547 A | 10/1952 | Meinecke |
| 2,633,698 A | 4/1953 | Nettel |
| 2,644,436 A | 7/1953 | Berlyn |
| 2,670,595 A | 3/1954 | Miller |
| 2,739,440 A | 3/1956 | Seifert et al. |
| 2,768,615 A | 10/1956 | Taylor et al. |
| 2,773,490 A | 12/1956 | Miller |
| 2,780,912 A | 2/1957 | Miller |
| 2,780,053 A | 5/1957 | Cowland |
| 2,817,322 A | 12/1957 | Miller |
| 2,832,324 A | 4/1958 | Barber |
| 2,910,826 A | 11/1959 | Mansfield |
| 2,991,616 A | 7/1961 | Miller |
| 3,015,934 A | 1/1962 | Miller |
| 3,029,594 A | 4/1962 | Miller |
| 3,113,561 A | 12/1963 | Heintz |
| 3,144,749 A | 8/1964 | Miller |
| 3,180,327 A | 4/1965 | Neir |
| 3,186,388 A | 6/1965 | Bricout |
| 3,232,042 A | 2/1966 | Sarra |
| 3,250,068 A | 5/1966 | Vulliamy |
| 3,257,797 A | 6/1966 | Lieberherr |
| 3,266,234 A | 8/1966 | Cook |
| 3,336,911 A | 8/1967 | Steiger |
| 3,355,877 A | 12/1967 | Chaffiotte |
| 3,405,692 A | 10/1968 | Paschke |
| 3,413,965 A | 12/1968 | Gavasso |
| 3,416,502 A | 12/1968 | Weiss |
| 3,591,958 A | 7/1971 | Nebgen |
| 3,665,905 A | 5/1972 | Brille et al. |
| 3,774,399 A | 11/1973 | Nohira et al. |
| 3,795,231 A | 3/1974 | Brille |
| 3,919,986 A | 11/1975 | Goto |
| 3,921,403 A | 11/1975 | McInerney et al. |
| 3,977,195 A | 8/1976 | Treuil |
| 3,986,351 A | 10/1976 | Woods et al. |
| 4,003,347 A | 1/1977 | Sasaki |
| 4,009,574 A | 3/1977 | Melchior |
| 4,020,809 A | 5/1977 | Kern et al. |
| 4,022,167 A | 5/1977 | Kristiansen |
| 4,033,304 A | 7/1977 | Luria |
| 4,050,435 A | 9/1977 | Fuller, Jr. et al. |
| 4,075,986 A | 2/1978 | Keck |
| 4,075,990 A | 2/1978 | Ribeton |
| 4,161,166 A | 7/1979 | Roznovsky |
| 4,180,035 A | 12/1979 | Saiki et al. |
| 4,192,265 A | 3/1980 | Amano et al. |
| 4,196,593 A | 4/1980 | Froeliger |
| 4,206,728 A | 6/1980 | Trenne |
| 4,215,659 A | 8/1980 | Lowther |
| 4,231,225 A | 11/1980 | Aya |
| 4,235,077 A | 11/1980 | Bryant |
| RE30,565 E | 4/1981 | Kristiansen |
| 4,261,307 A | 4/1981 | Oldberg |
| 4,276,865 A | 7/1981 | Hamai |
| 4,282,933 A | 8/1981 | Suganami et al. |
| 4,299,090 A | 11/1981 | Deutschmann |
| 4,327,676 A | 5/1982 | McIntire et al. |
| 4,350,013 A | 9/1982 | Yoshiba |
| 4,387,672 A | 6/1983 | Crocker |
| 4,400,945 A | 8/1983 | Deutschmann et al. |
| 4,423,709 A | 1/1984 | Arrieta |
| 4,424,790 A | 1/1984 | Curtil |
| 4,426,848 A | 1/1984 | Stachowicz |
| 4,426,985 A | 1/1984 | Kanesaka |
| 4,438,737 A | 3/1984 | Burandt |
| 4,446,821 A | 5/1984 | Cataldo |
| 4,474,008 A | 10/1984 | Sakurai et al. |
| 4,490,971 A | 1/1985 | Hedelin |
| 4,494,506 A | 1/1985 | Hayama et al. |
| 4,539,946 A | 9/1985 | Hedelin |
| 4,539,948 A | 9/1985 | Toepel |
| 4,539,951 A | 9/1985 | Hara et al. |
| 4,550,568 A | 11/1985 | Deutschmann et al. |
| 4,553,385 A | 11/1985 | Lamont |
| 4,561,253 A | 12/1985 | Curtil |
| 4,563,132 A | 1/1986 | Grimmer |
| 4,570,442 A | 2/1986 | Deutschmann et al. |
| 4,572,114 A | 2/1986 | Sickler |
| 4,584,974 A | 4/1986 | Aoyama et al. |
| 4,592,310 A | 6/1986 | Hitomi et al. |
| 4,592,319 A | 6/1986 | Meistrick |
| 4,592,329 A | 6/1986 | Yunick |
| 4,598,611 A | 7/1986 | Frank |
| 4,608,951 A | 9/1986 | White |
| 4,622,167 A | 11/1986 | Heath et al. |
| 4,633,403 A | 12/1986 | Asmus |
| 4,633,844 A | 1/1987 | Okimoto |
| 4,643,049 A | 2/1987 | Nishikawa et al. |
| 4,651,684 A | 3/1987 | Masuda et al. |
| 4,667,636 A | 5/1987 | Oishi et al. |
| 4,700,684 A | 10/1987 | Pischinger et al. |
| 4,702,218 A | 10/1987 | Yoshioka et al. |
| 4,714,063 A | 12/1987 | Oda et al. |
| 4,716,863 A | 1/1988 | Pruzan |
| 4,722,315 A | 2/1988 | Pickel |
| 4,730,457 A | 3/1988 | Yamada et al. |
| 4,738,110 A | 4/1988 | Tateno |
| 4,753,198 A | 6/1988 | Heath |
| 4,756,285 A | 7/1988 | Pischinger |
| 4,759,188 A | 7/1988 | Schatz |
| 4,770,060 A | 9/1988 | Elrod et al. |
| 4,771,742 A | 9/1988 | Nelson et al. |
| 4,777,916 A | 10/1988 | Holmer |
| 4,798,184 A | 1/1989 | Palko |
| 4,805,571 A | 2/1989 | Humphrey |
| 4,815,423 A | 3/1989 | Holmér |
| 4,833,971 A | 5/1989 | Kubik |
| 4,836,161 A | 6/1989 | Abthoff et al. |
| 4,841,936 A | 6/1989 | Takahashi |
| 4,852,353 A | 8/1989 | Holmer |
| 4,860,704 A | 8/1989 | Slaughter |
| 4,862,841 A | 9/1989 | Stevenson |
| 4,864,984 A | 9/1989 | Blish |
| 4,876,988 A | 10/1989 | Paul et al. |
| 4,878,464 A | 11/1989 | Richeson, Jr. et al. |
| 4,885,911 A | 12/1989 | Woollenweber et al. |
| 4,903,488 A | 2/1990 | Shibata |
| 4,916,903 A | 4/1990 | Holmer |
| 4,917,058 A | 4/1990 | Nelson et al. |
| 4,928,648 A | 5/1990 | Schatz et al. |
| 4,930,315 A | 6/1990 | Kanesaka |
| 4,934,344 A | 6/1990 | Perr |
| 4,936,263 A | 6/1990 | Tamba et al. |

| | | | | | | |
|---|---|---|---|---|---|---|
| 4,945,870 A | 8/1990 | Richeson | | 5,417,186 A | 5/1995 | Elrod et al. |
| 4,957,069 A | 9/1990 | Mederer | | 5,417,189 A | 5/1995 | Regueiro |
| 4,958,606 A | 9/1990 | Hitomi et al. | | 5,419,301 A | 5/1995 | Schechter |
| 4,959,961 A | 10/1990 | Hiereth | | 5,421,296 A | 6/1995 | Hitomi et al. |
| 4,961,406 A | 10/1990 | Burandt | | 5,421,308 A | 6/1995 | Hitomi et al. |
| 4,964,375 A | 10/1990 | Takeyama et al. | | 5,425,239 A | 6/1995 | Gobert |
| 4,982,567 A | 1/1991 | Hashimoto et al. | | 5,426,936 A | 6/1995 | Levendis et al. |
| 5,000,145 A | 3/1991 | Quenneville | | 5,427,078 A | 6/1995 | Hitomi et al. |
| 5,002,022 A | 3/1991 | Perr | | 5,429,100 A | 7/1995 | Goto et al. |
| 5,005,652 A | 4/1991 | Johnson | | 5,433,180 A | 7/1995 | Hitomi et al. |
| 5,012,778 A | 5/1991 | Pitzi | | 5,440,880 A | 8/1995 | Ceynow et al. |
| 5,020,327 A | 6/1991 | Tashima et al. | | 5,443,050 A | 8/1995 | Hitomi et al. |
| 5,033,268 A | 7/1991 | Hitomi et al. | | 5,445,116 A | 8/1995 | Hara |
| 5,036,663 A | 8/1991 | Akagi et al. | | 5,445,128 A | 8/1995 | Letang et al. |
| 5,050,378 A | 9/1991 | Clemmens | | 5,452,694 A | 9/1995 | Hara |
| 5,054,439 A | 10/1991 | Akagi et al. | | 5,456,222 A | 10/1995 | Schechter |
| 5,076,248 A | 12/1991 | Schatz | | 5,456,224 A | 10/1995 | Riley |
| 5,083,543 A | 1/1992 | Harada et al. | | 5,456,225 A | 10/1995 | Oikawa et al. |
| 5,090,202 A | 2/1992 | Hitomi et al. | | 5,465,702 A | 11/1995 | Ferrenberg |
| 5,103,645 A | 4/1992 | Haring | | 5,469,818 A | 11/1995 | Yoshioka et al. |
| 5,107,802 A | 4/1992 | Yagi et al. | | 5,479,890 A | 1/1996 | Hu et al. |
| 5,117,790 A | 6/1992 | Clarke et al. | | 5,488,970 A | 2/1996 | Cippitani |
| 5,119,795 A | 6/1992 | Goto et al. | | 5,492,103 A | 2/1996 | Goto |
| 5,121,733 A | 6/1992 | Goto et al. | | 5,493,798 A | 2/1996 | Rocke et al. |
| 5,131,229 A | 7/1992 | Kriegler et al. | | 5,494,008 A | 2/1996 | Ohkawa et al. |
| 5,131,354 A | 7/1992 | Richeson | | 5,494,009 A | 2/1996 | Yamada et al. |
| 5,138,839 A | 8/1992 | Hitomi et al. | | 5,495,830 A | 3/1996 | Wu |
| 5,140,953 A | 8/1992 | Fogelberg | | 5,497,737 A | 3/1996 | Nakamura |
| 5,140,955 A | 8/1992 | Sono et al. | | 5,509,394 A | 4/1996 | Hitomi et al. |
| 5,142,866 A | 9/1992 | Yanagihara et al. | | 5,518,818 A | 5/1996 | Kidai et al. |
| 5,161,497 A | 11/1992 | Simko et al. | | 5,520,161 A | 5/1996 | Klopp |
| 5,186,139 A | 2/1993 | Matsura | | 5,531,193 A | 7/1996 | Nakamura |
| 5,189,998 A | 3/1993 | Hara | | 5,535,704 A | 7/1996 | Paul |
| 5,191,867 A | 3/1993 | Glassey | | 5,535,716 A | 7/1996 | Sato et al. |
| 5,201,907 A | 4/1993 | Hitomi et al. | | 5,546,914 A | 8/1996 | Scheinert |
| 5,203,311 A | 4/1993 | Hitomi et al. | | 5,549,080 A | 8/1996 | Uchikawa |
| 5,205,251 A | 4/1993 | Conklin | | 5,549,095 A | 8/1996 | Goto et al. |
| 5,205,265 A | 4/1993 | Kashiyama et al. | | 5,553,573 A | 9/1996 | Hara et al. |
| 5,215,061 A | 6/1993 | Ogawa et al. | | 5,557,983 A | 9/1996 | Hara et al. |
| 5,216,987 A | 6/1993 | Clarke | | 5,558,060 A | 9/1996 | Horie et al. |
| 5,230,320 A | 7/1993 | Hitomi et al. | | 5,560,207 A | 10/1996 | Ramsden et al. |
| 5,233,831 A | 8/1993 | Hitomi et al. | | 5,564,275 A | 10/1996 | Codan et al. |
| 5,233,948 A | 8/1993 | Boggs et al. | | 5,564,386 A | 10/1996 | Korte et al. |
| 5,235,940 A | 8/1993 | Nakatani | | 5,586,526 A | 12/1996 | Lindquist |
| 5,239,960 A | 8/1993 | Sasaki et al. | | 5,586,527 A | 12/1996 | Kreuter |
| 5,251,595 A | 10/1993 | Wei-Min | | 5,586,531 A | 12/1996 | Vittorio |
| 5,253,622 A | 10/1993 | Bornstein et al. | | 5,588,411 A | 12/1996 | Kreuter et al. |
| 5,255,637 A | 10/1993 | Schechter | | 5,590,632 A | 1/1997 | Kato et al. |
| 5,255,641 A | 10/1993 | Schechter | | 5,606,942 A | 3/1997 | Tsuzuku et al. |
| 5,255,654 A | 10/1993 | Karlsson | | 5,607,010 A | 3/1997 | Schonfeld et al. |
| 5,271,359 A | 12/1993 | Teramoto et al. | | 5,611,202 A | 3/1997 | Sumser et al. |
| 5,279,273 A | 1/1994 | Nakata et al. | | 5,611,204 A | 3/1997 | Radovanovic et al. |
| 5,293,741 A | 3/1994 | Kashiyama et al. | | 5,611,303 A | 3/1997 | Izuo |
| 5,309,756 A | 5/1994 | Osawa et al. | | 5,615,554 A | 4/1997 | Gobert |
| 5,327,856 A | 7/1994 | Schroeder et al. | | 5,615,646 A | 4/1997 | Feucht |
| 5,327,858 A | 7/1994 | Hausknecht | | 5,617,726 A | 4/1997 | Sheridan et al. |
| 5,333,456 A | 8/1994 | Bollinger | | 5,619,965 A | 4/1997 | Cosma et al. |
| 5,335,633 A | 8/1994 | Thien | | 5,622,053 A | 4/1997 | Freen |
| 5,341,771 A | 8/1994 | Riley | | 5,622,144 A | 4/1997 | Nakamura et al. |
| 5,357,936 A | 10/1994 | Hitomi et al. | | 5,623,896 A | 4/1997 | Kato et al. |
| 5,363,816 A | 11/1994 | Yorita et al. | | 5,626,109 A | 5/1997 | Yasumura et al. |
| 5,365,895 A | 11/1994 | Riley | | 5,632,255 A | 5/1997 | Ferrenberg |
| 5,365,896 A | 11/1994 | Hara et al. | | 5,645,020 A | 7/1997 | Yamada |
| 5,367,990 A | 11/1994 | Schechter | | 5,645,030 A | 7/1997 | Letsche |
| 5,377,631 A | 1/1995 | Schechter | | 5,649,516 A | 7/1997 | Laveran |
| 5,379,743 A | 1/1995 | Stokes et al. | | 5,657,630 A | 8/1997 | Kjemtrup et al. |
| 5,389,051 A | 2/1995 | Hirate et al. | | 5,660,155 A | 8/1997 | Taue et al. |
| 5,390,492 A | 2/1995 | Levendis | | 5,661,835 A | 8/1997 | Kato et al. |
| 5,392,740 A | 2/1995 | Teramoto et al. | | 5,664,528 A | 9/1997 | Kato et al. |
| 5,396,874 A | 3/1995 | Hitomi et al. | | 5,664,529 A | 9/1997 | Kato et al. |
| 5,398,502 A | 3/1995 | Watanabe | | 5,671,600 A | 9/1997 | Pischinger et al. |
| 5,404,844 A | 4/1995 | Schechter | | 5,678,515 A | 10/1997 | Kato et al. |
| 5,408,979 A | 4/1995 | Backlund et al. | | 5,680,841 A | 10/1997 | Hu |

| | | | | | | |
|---|---|---|---|---|---|---|
| 5,682,854 | A | 11/1997 | Ozawa | 6,234,123 | B1 | 5/2001 | Iiyama et al. |
| 5,692,464 | A | 12/1997 | Kimura | 6,234,144 | B1 | 5/2001 | Yamaguchi et al. |
| 5,704,316 | A | 1/1998 | Fujimoto et al. | 6,237,551 | B1 | 5/2001 | Macor et al. |
| 5,711,154 | A | 1/1998 | Baechle et al. | 6,244,257 | B1 | 6/2001 | Hu |
| 5,713,317 | A | 2/1998 | Yoshioka | 6,260,523 | B1 | 7/2001 | Nakamura et al. |
| 5,713,330 | A | 2/1998 | Hitomi et al. | 6,266,957 | B1 | 7/2001 | Nozawa et al. |
| 5,713,331 | A | 2/1998 | Eisenbacher et al. | 6,267,107 | B1 | 7/2001 | Ward |
| 5,718,199 | A | 2/1998 | Hu et al. | 6,273,076 | B1 | 8/2001 | Beck et al. |
| 5,724,927 | A | 3/1998 | Suzuki | 6,276,316 | B1 | 8/2001 | Arai et al. |
| 5,724,939 | A | 3/1998 | Faletti et al. | 6,279,550 | B1 | 8/2001 | Bryant |
| 5,732,554 | A | 3/1998 | Sasaki et al. | 6,286,482 | B1 | 9/2001 | Flynn et al. |
| 5,732,678 | A | 3/1998 | Lindquist et al. | 6,295,816 | B1 | 10/2001 | Gallagher et al. |
| 5,762,480 | A | 6/1998 | Adahan | 6,298,300 | B1 | 10/2001 | Ohyama et al. |
| 5,771,868 | A | 6/1998 | Khair | 6,301,887 | B1 | 10/2001 | Gorel et al. |
| 5,775,099 | A | 7/1998 | Ito et al. | 6,301,889 | B1 | 10/2001 | Gladden et al. |
| 5,775,283 | A | 7/1998 | Sawai et al. | 6,302,076 | B1 | 10/2001 | Bredy |
| 5,778,674 | A | 7/1998 | Kimura | 6,311,493 | B1 | 11/2001 | Kurihara et al. |
| 5,787,859 | A | 8/1998 | Meistrick et al. | 6,332,447 | B1 | 12/2001 | Kimura et al. |
| 5,791,146 | A | 8/1998 | Dungner | 6,338,244 | B1 | 1/2002 | Guenther et al. |
| 5,794,445 | A | 8/1998 | Dungner | 6,338,245 | B1 | 1/2002 | Shimoda et al. |
| 5,806,308 | A | 9/1998 | Khair et al. | 6,343,473 | B1 | 2/2002 | Kanesaka |
| 5,809,964 | A | 9/1998 | Meistrick et al. | 6,354,254 | B1 | 3/2002 | Usko |
| 5,813,231 | A | 9/1998 | Faletti et al. | 6,394,051 | B1 | 5/2002 | Filipe et al. |
| 5,816,216 | A | 10/1998 | Egashira et al. | 6,405,694 | B2 | 6/2002 | Sato |
| 5,819,702 | A | 10/1998 | Mendler | 6,439,195 | B1 | 8/2002 | Warner |
| 4,839,453 | A | 11/1998 | Hu | 6,460,337 | B1 | 10/2002 | Olofsson |
| 5,829,397 | A | 11/1998 | Vorih et al. | 6,467,452 | B1 | 10/2002 | Duffy et al. |
| 5,839,400 | A | 11/1998 | Vattaneo et al. | 6,474,323 | B1 | 11/2002 | Beck et al. |
| 5,839,453 | A | 11/1998 | Hu | 6,502,551 | B2 | 1/2003 | Antonioli et al. |
| 5,845,613 | A | 12/1998 | Yoshikawa | 6,513,319 | B2 | 2/2003 | Nozawa et al. |
| 5,848,529 | A | 12/1998 | Katoh et al. | 6,516,264 | B2 | 2/2003 | Ohyama et al. |
| 5,854,988 | A | 12/1998 | Davidson et al. | 6,571,765 | B2 | 6/2003 | Kuboshima et al. |
| 5,857,437 | A | 1/1999 | Yoshioka | 6,575,129 | B2 | 6/2003 | Almkvist et al. |
| 5,862,790 | A | 1/1999 | Dai et al. | 6,591,795 | B2 | 7/2003 | Janak |
| 5,875,743 | A | 3/1999 | Dickey | 6,609,315 | B1 | 8/2003 | Hendron et al. |
| 5,924,395 | A | 7/1999 | Moriya et al. | 6,637,386 | B2 | 10/2003 | Murata et al. |
| 5,927,075 | A | 7/1999 | Khair | 6,640,754 | B1 | 11/2003 | Iida |
| 5,937,807 | A | 8/1999 | Peters et al. | 6,651,618 | B1 | 11/2003 | Coleman et al. |
| 5,950,582 | A | 9/1999 | Stein | 6,662,552 | B1 | 12/2003 | Gunther et al. |
| 5,957,096 | A | 9/1999 | Clarke et al. | 6,679,207 | B1 | 1/2004 | Leman |
| 5,960,755 | A | 10/1999 | Diggs et al. | 6,688,280 | B2 | 2/2004 | Weber et al. |
| 5,967,115 | A | 10/1999 | Konopka et al. | 6,722,349 | B2 | 4/2004 | Leman et al. |
| 5,970,929 | A | 10/1999 | Tacquet | 6,725,647 | B2 | 4/2004 | Pfeifer et al. |
| 5,992,361 | A | 11/1999 | Murata et al. | 6,732,507 | B1 | 5/2004 | Stanglmaier et al. |
| 5,992,390 | A | 11/1999 | Moyer | 6,732,685 | B2 | 5/2004 | Leman |
| 5,996,560 | A | 12/1999 | Schechter | 6,739,125 | B1 | 5/2004 | Mulligan |
| 6,000,374 | A | 12/1999 | Cosma et al. | 6,772,742 | B2 | 8/2004 | Lei et al. |
| 6,003,316 | A | 12/1999 | Baert et al. | 6,925,976 | B2 | 8/2005 | Israel et al. |
| 6,006,706 | A | 12/1999 | Kanzaki | 6,928,807 | B2 | 8/2005 | Jacob et al. |
| 6,012,424 | A | 1/2000 | Meistrick | 6,951,211 | B2 | 10/2005 | Bryant |
| 6,020,651 | A | 2/2000 | Nakamura et al. | 6,955,144 | B2 | 10/2005 | Sakai et al. |
| 6,026,786 | A | 2/2000 | Groff et al. | 7,004,122 | B2 | 2/2006 | Cornell et al. |
| 6,035,639 | A | 3/2000 | Kolmanovsky et al. | 7,007,650 | B2 | 3/2006 | Harmon |
| 6,035,640 | A | 3/2000 | Kolmanovsky et al. | 2001/0002379 | A1 | 5/2001 | Schechter |
| 6,041,602 | A | 3/2000 | Dickey | 2001/0023671 | A1 | 9/2001 | Vorih |
| 6,058,348 | A | 5/2000 | Ohyama et al. | 2002/0011233 | A1 | 1/2002 | Takuya Shiraishi et al. |
| 6,067,800 | A | 5/2000 | Kolmanovsky et al. | 2002/0026913 | A1 | 3/2002 | Ariga |
| 6,067,946 | A | 5/2000 | Bunker et al. | 2002/0062799 | A1 | 5/2002 | Murata et al. |
| 6,076,353 | A | 6/2000 | Freudenberg et al. | 2002/0117126 | A1 | 8/2002 | Kaneko |
| 6,079,378 | A | 6/2000 | Taue et al. | 2002/0157623 | A1 | 10/2002 | Turner et al. |
| 6,082,328 | A | 7/2000 | Meistrick et al. | 2003/0106542 | A1 | 6/2003 | Aoyama et al. |
| 6,085,705 | A | 7/2000 | Vorih | 2003/0164163 | A1 | 9/2003 | Lei et al. |
| 6,095,127 | A | 8/2000 | Kolmanovsky et al. | 2004/0020204 | A1 | 2/2004 | Callas et al. |
| 6,101,998 | A | 8/2000 | Tamura et al. | 2003/0145810 | A1 | 6/2004 | Leman et al. |
| 6,112,523 | A | 9/2000 | Kamo | 2004/0118118 | A1 | 6/2004 | Weber et al. |
| 6,128,902 | A | 10/2000 | Kolmanovsky et al. | 2004/0206331 | A1 | 10/2004 | Leman |
| 6,135,073 | A | 10/2000 | Feucht et al. | 2004/0237507 | A1 | 12/2004 | Duvinage et al. |
| 6,148,778 | A | 11/2000 | Sturman | 2005/0087159 | A1 | 4/2005 | Harmon |
| 6,170,441 | B1 | 1/2001 | Haldeman et al. | 2005/0098162 | A1 | 5/2005 | Bryant |
| 6,178,749 | B1 | 1/2001 | Kolmanovsky et al. | | | | |
| 6,189,504 | B1 | 2/2001 | Israel et al. | | | | |
| 6,209,516 | B1 | 4/2001 | Yamashita | | | | |
| 6,223,846 | B1 | 5/2001 | Schechter | | | | |

| | | |
|---|---|---|
| 2005/0183692 A1 | 8/2005 | Weber et al. |

FOREIGN PATENT DOCUMENTS

| | | |
|---|---|---|
| AT | 003 205 | 11/1999 |
| AU | B1-33 707/78 | 4/1982 |
| AU | A-15966/83 | 6/1983 |
| DE | 286050 | 7/1915 |
| DE | 1 001 049 | 1/1957 |
| DE | 1 576 255 | 4/1970 |
| DE | 2 125 368 | 12/1971 |
| DE | 24 57 208 A1 | 6/1976 |
| DE | 28 09 473 | 9/1978 |
| DE | 27 34 715 A1 | 2/1979 |
| DE | 78 03 641 U1 | 8/1979 |
| DE | 28 14 343 | 10/1979 |
| DE | 29 24 926 | 1/1980 |
| DE | 29 26 327 A1 | 1/1981 |
| DE | 29 30 124 | 2/1981 |
| DE | 29 30 124 A1 | 2/1981 |
| DE | 29 42 326 A1 | 4/1981 |
| DE | 30 06 619 A1 | 8/1981 |
| DE | 30 22 688 | 12/1981 |
| DE | 31 24 668 A1 | 1/1983 |
| DE | 32 28 680 | 2/1984 |
| DE | 34 18 361 | 10/1984 |
| DE | 33 47 567 | 7/1985 |
| DE | 35 26 532 | 2/1986 |
| DE | 34 37 330 | 4/1986 |
| DE | 37 16947 C1 | 3/1988 |
| DE | 37 25 448 | 2/1989 |
| DE | 37 30 001 A1 | 3/1989 |
| DE | 37 37 822 | 5/1989 |
| DE | 37 37 820 C2 | 8/1989 |
| DE | 37 37 823 | 8/1989 |
| DE | 39 03 47 A1 | 9/1989 |
| DE | 39 08 475 | 9/1989 |
| DE | 38 24 133 | 1/1990 |
| DE | 39 31 379 | 3/1990 |
| DE | 38 35 333 A1 | 4/1990 |
| DE | 40 04 806 | 8/1991 |
| DE | 40 07 516 | 9/1991 |
| DE | 41 15 008 A1 | 11/1992 |
| DE | 42 16 759 | 2/1993 |
| DE | 692 06 718 | 3/1993 |
| DE | 43 08 354 A1 | 9/1993 |
| DE | 43 12 085 | 10/1993 |
| DE | 43 12 205 | 10/1993 |
| DE | 43 32 604 | 3/1994 |
| DE | 44 16 670 | 2/1995 |
| DE | 195 11 320 | 10/1995 |
| DE | 44 39 940 | 5/1996 |
| DE | 44 40 289 A1 | 5/1996 |
| DE | 44 43 169 A1 | 6/1996 |
| DE | 195 15 325 A1 | 10/1996 |
| DE | 195 14500 A1 | 10/1996 |
| DE | 196 10 277 | 10/1996 |
| DE | 195 17 590 | 11/1996 |
| DE | 196 16 555 | 11/1996 |
| DE | 196 48 337 A1 | 6/1998 |
| DE | 19905636 | 3/2000 |
| DE | 100 09 180 | 9/2001 |
| DE | 101 59 801 | 4/2003 |
| EP | 0 095 252 A2 | 11/1983 |
| EP | 0 275 244 A1 | 7/1988 |
| EP | 0 291 792 A2 | 11/1988 |
| EP | 0 344 780 A2 | 12/1989 |
| EP | 0 440 314 A2 | 8/1991 |
| EP | 0 269 125 B1 | 8/1992 |
| EP | 0 560 476 | 9/1993 |
| EP | 0 560 476 A1 | 9/1993 |
| EP | 0 568 214 | 11/1993 |
| EP | 0 596 855 | 5/1994 |
| EP | 0 596 860 A2 | 5/1994 |
| EP | 0 646 703 A2 | 4/1995 |
| EP | 0 718 481 A2 | 6/1996 |
| EP | 0 761 950 | 3/1997 |
| EP | 0 646 703 B1 | 12/1997 |
| EP | 0 857 866 A1 | 8/1998 |
| EP | 0 690 214 B1 | 10/1999 |
| EP | 0 961 018 A1 | 12/1999 |
| EP | 1 022 446 A1 | 7/2000 |
| EP | 1 116 870 A2 | 7/2001 |
| EP | 1 178 192 A2 | 2/2002 |
| EP | 1 234 960 A2 | 8/2002 |
| FR | 1 066 038 | 6/1954 |
| FR | 1066038 | 6/1954 |
| FR | 2 221 021 | 10/1974 |
| FR | 2 242 884 | 3/1975 |
| FR | 2 269 282 | 11/1975 |
| FR | 2 355 997 | 1/1978 |
| FR | 2 393 937 | 1/1979 |
| FR | 2 417 014 | 9/1979 |
| FR | 2 476 741 | 8/1981 |
| FR | 2 485 622 | 12/1981 |
| FR | 2 583 108 A2 | 12/1986 |
| FR | 2 674 285 A1 | 3/1991 |
| FR | 2 703 107 | 9/1994 |
| FR | 2 757 211 | 6/1998 |
| FR | 2 780 093 A3 | 12/1999 |
| GB | 1 303 080 | 1/1973 |
| GB | 1 321 452 | 6/1973 |
| GB | 1 331 348 | 9/1973 |
| GB | 1 437 171 | 5/1976 |
| GB | 1 467 969 | 3/1977 |
| GB | 2018352 | 10/1979 |
| GB | 2 072 957 | 10/1981 |
| GB | 2 129 055 | 5/1984 |
| GB | 2 165 587 | 4/1986 |
| GB | 2 180 298 | 3/1987 |
| GB | 2 202 001 | 9/1988 |
| GB | 2 253 881 | 9/1992 |
| GB | 2 301 398 | 4/1996 |
| GB | 2 300 226 | 10/1996 |
| GB | 2 366 328 | 3/2002 |
| GB | 2 366 330 | 3/2002 |
| GB | 2 366 331 | 3/2002 |
| GB | 2 367 147 | 3/2002 |
| GB | 2 367 148 | 3/2002 |
| GB | 2 368 614 | 5/2002 |
| JP | 51-13024 | 2/1976 |
| JP | 55-153820 | 12/1980 |
| JP | 56-18030 | 2/1981 |
| JP | 56-101022 | 8/1981 |
| JP | 56-101031 | 8/1981 |
| JP | 58-30416 | 2/1983 |
| JP | 58-51221 | 3/1983 |
| JP | 58-53634 | 3/1983 |
| JP | 58-53635 | 3/1983 |
| JP | 58-57019 | 4/1983 |
| JP | 58-59317 | 4/1983 |
| JP | 58-62314 | 4/1983 |
| JP | 58-65932 | 4/1983 |
| JP | 58-117319 | 7/1983 |
| JP | 58-119920 | 7/1983 |
| JP | 58-122314 | 7/1983 |
| JP | 58-122315 | 7/1983 |
| JP | 58-122318 | 7/1983 |
| JP | 58-131311 | 8/1983 |
| JP | 58-131422 | 8/1983 |
| JP | 58-133450 | 8/1983 |
| JP | 58-180722 | 10/1983 |
| JP | 58-187540 | 11/1983 |
| JP | 58-211526 | 12/1983 |
| JP | 59-7744 | 1/1984 |
| JP | 59-60034 | 4/1984 |

| | | | | | | |
|---|---|---|---|---|---|---|
| JP | 59-99025 | 6/1984 | | JP | 06-235307 | 8/1994 |
| JP | 59-119007 | 7/1984 | | JP | 06-241097 | 8/1994 |
| JP | 59-158321 | 9/1984 | | JP | 06-346711 | 12/1994 |
| JP | 59-188031 | 10/1984 | | JP | 07-4287 | 1/1995 |
| JP | 59-211720 | 11/1984 | | JP | 07-26994 | 1/1995 |
| JP | 60-19916 | 2/1985 | | JP | 07-27022 | 1/1995 |
| JP | 60-90926 | 5/1985 | | JP | 07-34883 A | 2/1995 |
| JP | 60-184918 | 9/1985 | | JP | 07-54664 | 2/1995 |
| JP | 61-70130 | 4/1986 | | JP | 07-34883 B2 | 4/1995 |
| JP | 61-89132 | 5/1986 | | JP | 07-091265 | 4/1995 |
| JP | 61-106918 | 5/1986 | | JP | 7-145740 | 6/1995 |
| JP | 61-106919 | 5/1986 | | JP | 07-156692 | 6/1995 |
| JP | 61-106920 | 5/1986 | | JP | 07-156696 | 6/1995 |
| JP | 61-164036 | 7/1986 | | JP | 07-158473 | 6/1995 |
| JP | 61-182421 | 8/1986 | | JP | 07-166829 | 6/1995 |
| JP | 62-174513 | 7/1987 | | JP | 07-166926 | 6/1995 |
| JP | 62-288333 | 12/1987 | | JP | 07-180514 | 7/1995 |
| JP | 63-38620 | 2/1988 | | JP | 07-224626 | 8/1995 |
| JP | 63-51121 | 3/1988 | | JP | 07-224671 | 8/1995 |
| JP | 63-55324 | 3/1988 | | JP | 07-224678 | 8/1995 |
| JP | 63-57822 | 3/1988 | | JP | 7-233744 | 9/1995 |
| JP | 63-124828 | 5/1988 | | JP | 07-247859 | 9/1995 |
| JP | 63-176616 | 7/1988 | | JP | 07-259655 | 10/1995 |
| JP | 363176616 A | 7/1988 | | JP | 07-269381 | 10/1995 |
| JP | 63-198728 | 8/1988 | | JP | 07-301107 | 11/1995 |
| JP | 63-61717 B2 | 11/1988 | | JP | 07-310564 | 11/1995 |
| JP | 63-168221 | 11/1988 | | JP | 07-310603 | 11/1995 |
| JP | 63-268926 | 11/1988 | | JP | 07-324610 | 12/1995 |
| JP | 63-268927 | 11/1988 | | JP | 08-28280 | 1/1996 |
| JP | 63-268942 | 11/1988 | | JP | 08-42381 | 2/1996 |
| JP | 363268942 A | 11/1988 | | JP | 08-61070 | 3/1996 |
| JP | 10-24414 | 1/1989 | | JP | 08-82218 | 3/1996 |
| JP | 64-315 | 1/1989 | | JP | 08-100662 | 4/1996 |
| JP | 64-24118 | 1/1989 | | JP | 08-158901 | 6/1996 |
| JP | 64-83820 | 3/1989 | | JP | 08-158957 | 6/1996 |
| JP | 64-87828 | 3/1989 | | JP | 08158957 A | 6/1996 |
| JP | 64-87829 | 3/1989 | | JP | 08-170551 | 7/1996 |
| JP | 02-140421 | 5/1990 | | JP | 08-177432 | 7/1996 |
| JP | 03-37318 | 2/1991 | | JP | 08-177433 | 7/1996 |
| JP | 03-96624 | 4/1991 | | JP | 08-177434 | 7/1996 |
| JP | 03-138419 | 6/1991 | | JP | 08-177435 | 7/1996 |
| JP | 03-156123 | 7/1991 | | JP | 08-177436 | 7/1996 |
| JP | 04-31653 | 2/1992 | | JP | 08-291715 | 11/1996 |
| JP | 04031653 A | 2/1992 | | JP | 08-326548 | 12/1996 |
| JP | 04-103867 | 4/1992 | | JP | 09-151737 | 6/1997 |
| JP | 04-136467 | 5/1992 | | JP | 02645942 B2 | 8/1997 |
| JP | 04-287859 | 10/1992 | | JP | 10-141068 | 5/1998 |
| JP | 04-129812 | 11/1992 | | JP | 10-169513 | 6/1998 |
| JP | 05-1575 | 1/1993 | | JP | 10-238354 | 9/1998 |
| JP | 05-5430 | 1/1993 | | JP | 11-62639 | 3/1999 |
| JP | 05-71426 | 3/1993 | | JP | 11-315726 | 11/1999 |
| JP | 05-71428 | 3/1993 | | JP | 2000-120457 | 4/2000 |
| JP | 05-86913 | 4/1993 | | JP | 2000-145484 | 5/2000 |
| JP | 05-86989 | 4/1993 | | JP | 03-96624 B2 | 8/2000 |
| JP | 05-099007 | 4/1993 | | JP | 2000-220480 | 8/2000 |
| JP | 05106415 A2 | 4/1993 | | JP | 2001-193468 | 7/2001 |
| JP | 05-149118 | 6/1993 | | JP | 2002-256911 | 9/2002 |
| JP | 05-149136 | 6/1993 | | JP | 2003-262137 | 9/2003 |
| JP | 05-179966 | 7/1993 | | JP | 2003-269202 | 9/2003 |
| JP | 05-187279 | 7/1993 | | SU | 248375 | 12/1969 |
| JP | 05-187329 | 7/1993 | | SU | 914788 | 3/1982 |
| JP | 05-202810 | 8/1993 | | SU | 1195026 A | 11/1985 |
| JP | 05-215002 | 8/1993 | | SU | 1195027 A | 11/1985 |
| JP | 05-340290 | 12/1993 | | SU | 1247573 A1 | 7/1986 |
| JP | 06-33775 | 2/1994 | | SU | 1668713 A1 | 8/1991 |
| JP | 06-74038 | 3/1994 | | SU | 1701953 A1 | 12/1991 |
| JP | 06-108860 | 4/1994 | | WO | WO 81/03200 | 11/1981 |
| JP | 06-108861 | 4/1994 | | WO | WO 83-04280 | 12/1983 |
| JP | 06-117280 | 4/1994 | | WO | WO 90-10141 | 9/1990 |
| JP | 6-119933 | 4/1994 | | WO | WO 90/15917 | 12/1990 |
| JP | 6-129271 | 5/1994 | | WO | WO 91-05152 | 4/1991 |
| JP | 06-200763 | 7/1994 | | WO | WO 92-04536 | 3/1992 |
| JP | 06-235305 | 8/1994 | | WO | WO 92/13178 | 8/1992 |

| WO | WO 94-28288 A2 | 12/1994 |
| WO | WO 94-28288 A3 | 12/1994 |
| WO | WO 95/08705 | 3/1995 |
| WO | WO 95-15429 | 6/1995 |
| WO | WO 95-16106 | 6/1995 |
| WO | WO 95/18294 | 7/1995 |
| WO | WO 95-23280 | 8/1995 |
| WO | WO 95-24549 | 9/1995 |
| WO | WO 95/33131 | 12/1995 |
| WO | WO 96/01939 | 1/1996 |
| WO | WO 96/15362 | 5/1996 |
| WO | WO 96-30635 | 10/1996 |
| WO | WO 97-11260 | 3/1997 |
| WO | WO 98/02653 | 1/1998 |
| WO | WO 98-07973 | 2/1998 |
| WO | WO 98-34014 | 8/1998 |
| WO | WO 98-55744 | 12/1998 |
| WO | WO 99/42718 | 8/1999 |
| WO | WO 99-42718 | 9/1999 |
| WO | WO 00-23698 | 4/2000 |
| WO | WO 00-28197 | 5/2000 |
| WO | WO 00-68565 A1 | 11/2000 |
| WO | WO 01/20150 | 3/2001 |
| WO | WO 01/46574 A2 | 6/2001 |
| WO | WO 01-69062 A1 | 9/2001 |
| WO | WO 01/86125 A1 | 11/2001 |
| WO | WO 2004/081356 | 9/2004 |

OTHER PUBLICATIONS

Yorihiro Fukuzawa et al., "Development of High Efficiency Miller Cycle Gas Engine", Mitsubishi Heavy Industries, Ltd., Technical Review, vol. 38, No 3, Oct. 2001, pp. 146-150.
Request for *Inter Partes* Reexamination Transmittal Form for U.S. Appl. No. 6,688,280, and Attachment to Request for *Inter Partes* Reexamination Transmittal Form, Sep. 17, 2004; Order Granting/Denying Request for Inter Partes Reexamination for Control No. 95/000,050 dated Dec. 10, 2004; Office Action dated Dec. 10, 2004, in Inter Partes Reexamination for Control No. 95/000,050; Patent Owner's Response To Office Action, filed Jan. 24, 2005, including Exhibits A and B; Comments of Requester, filed Feb. 23, 2005, including Declaration of Jack A. Ekchlan, Ph.D.,
including Exhibit A; Exhibit B: Dresner et al., "A Review and Classification of Variable Valve Timing Mechanisms", SAE Technical Paper Series, Mar. 1989; and Exhibit C: Dickey et al., "Nox Control in Heavy-Duty Diesel Engines—What is the Limit?" SAE Technical Paper Series, Feb. 1998; and including Declaration of David F. Merrion, including Exhibit A and Exhibit B: Dresner et al., "A Review and Classification of Variable Valve Timing Mechanisms", SAE Technical Paper Series, Mar. 1989.
Request for *Inter Partes* Reexamination Transmittal Form for U.S. Appl. No. 6,651,618, and Attachment to Request for *Inter Partes* Reexamination Form, Aug. 27, 2004; Order Granting/Denying Request for Inter Partes Reexamination for Control No. 95/000,049 dated Nov. 23, 2004; Office Action in Inter Partes Reexamination for Control No. 95/000,049 dated Nov. 23, 2004; Patent Owner's Response to Office Action, filed Jan. 24, 2005, including Exhibits A and B; Comments of Requester, filed Feb. 23, 2005, including Declaration of Jack A. Ekchian, Ph.D.,
including Exhibit A, Exhibit B: Dresner et al., "A Review and Classification of Variable Valve Timing Mechanisms", SAE Technical Paper Series, Mar. 1989; and Exhibit C: Dickey et al., "Nox Control in Heavy-Duty Diesel Engines—What is the Limit?" SAE Technical Paper Series, Feb. 1998; and including Declaration of David F. Merrion, including Exhibit A and Exhibit B: Dresner et al., "A Review and Classification of Variable Valve Timing Mechanisms", SAE Technical Paper Series, Mar. 1989.
Office Action dated Jun. 2, 2003, for U.S. Appl. No. 10/370,852; Amendment filed Jul. 10, 2003.
Office Action dated Jun. 2, 2003, for U.S. Appl. No. 10/143,908; Reply to Office Action filed Sep. 2, 2003.
Obert, "Internal Combustion Engines and Air Pollution," Based on Internal Combustion Engines, Third Edition, 1973, pp. 612-614.

Edwards et al., "The Potential of a Combined Miller Cycle and Internal EGR Engine for Future Heavy Duty Truck Applications," SAE International, International Congress and Exposition, Feb. 23-26, 1998, pp. 1-19.
Challen et al., "Diesel Engine Reference Book, Second Edition," SAE International, 1999, pp. 75, 81, 84, 146, and 263-305.
Co-pending U.S. Appl. No. 10/992,198; Title: Combustion Engine Including-Fluidically-Driven Engine Valve Actuator, filed Nov. 19, 2004.
Co-pending U.S. Appl. No. 10/992,137; Title: Combustion Engine Including Fluidically-Driven Engine Valve Actuator, filed Nov. 19, 2004.
Office Action dated May 28, 2004, for U.S. Appl. No. 10/733,570; Amendment filed on Nov. 19, 2004.
Co-pending U.S. Appl. No. 10/993,300; Title: Air and Fuel Supply System for Combustion Engine, filed Sep. 3, 2004.
Co-pending U.S. Appl. No. 10/992,074; Title: Combustion Engine Including Cam Phase-Shifting, filed Nov. 19, 2004.
Co-pending U.S. Appl. No. 10/992,866; Title: Air and Fuel Supply System for Combustion Engine With Particulate Trap, filed Nov. 19, 2004.
Co-pending U.S. Appl. No. 10/992,857; Title: Air and Fuel Supply for Combustion Engine Operating at Optimum Engine Speed, filed Nov. 19, 2004.
Co-pending U.S. Appl. No. 10/992,897; Title: Air and Fuel Supply System for Combustion Engine, filed Nov. 19, 2004.
Co-pending U.S. Appl. No. 10/993,065; Title: Air and Fuel Supply System for Combustion Engine Operating in HCCI Mode, filed Nov. 19, 2004.
Co-pending U.S. Appl. No. 10/992,070; Title: Combustion Engine Including Exhaust Purification With On-Board Ammonia Production, filed Nov. 19, 2004.
Co-pending U.S. Appl. No. 10/992,071; Title: Combustion Engine Including Engine Valve Actuation System, filed Nov. 19, 2004.
Co-pending U.S. Appl. No. 10/992,125; Title: Air and Fuel Supply System for a Combustion Engine, filed Nov. 19, 2004.
Miller, R. and Lieberherr, H., "The Miller Supercharging System for Diesel and Gas Engines Operating Characteristics", International Congress of Combustion Engine Conference, CIMAC, 1957, pp. 787-803.
Miller, R., "Supercharging and Internal Cooling Cycle for High Output", Oil and Gas Power Division proceedings of the National Conference, 1946, ASME 46-OGP-4, pp. 1-5.
Morel, T. et al., "Application of Several Variable Valve Timing Concepts to an LHR Engine", Journal of Engineering for Gas Turbines and Power, 1987, pp. 402-409, vol. 109, ASME 87-ICE-29.
Assanis, D. and Bolton, B., "Variable Valve Timing Strategies for Optimum Engine Performance and Fuel Economy", Jan. 23-27, 1994, ASME 94-ICE-5, pp. 1-11.
Zappa, G. and Franca, T., "A 4-Stroke High Speed Diesel Engine with Two-Stage of Supercharging and Variable Compression Ratio", 13th International Congress on Combustion Engines, 1979, pp. D19-1-D19-22.
Dresner, T. and Barkan, P., "A Review of Variable Valve Timing Benefits and Modes of Operation", SAE Technical Paper Series 891676, 1989, pp. 1-9.
Ahmad, T. and Theobald, M., "A Survey of Variable -Valve-Actuation Technology", SAE Technical Paper Series 891674, Aug. 7-10, 1989, pp. 1-27.
Ma, T., "Effect of Variable Engine Valve Timing on Fuel Economy", SAE Technical Paper Series 880390, Feb. 29-Mar. 4, 1988, pp. 1-8.
Ma, T. and Rajabu, H., "Computer Simulation of an Otto-Atkinson Cycle Engine with Variable Timing Multi-Intake Valves and Variable Compression Ratio", IMechE C53/88, 1988, pp. 237-277.
Porter, B. et al., "Control Technology for Future Low Emissions Diesel Passenger Cars", C517/035/96, 12 pages.
Charlton, S. et al., "Application of Variable Valve Timing To a Highly Turbo Charged Diesel Engine", C405/044, IMechE, 1990, pp. 189-195.
Ladommatos, N. and Stone, C., "Developments for Direct Injection Diesel Engines", Mechanical Engineering Publications Limited, 1986, pp. 41-53.

Roe, G., "Variable Valve-Timing Unit Suitable for Internal Combustion Engines", vol. 186 23/72, pp. 301-306 and D103-D105.
Payri, F. et al., "Reduction of Pumping Losses By the Use of a Variable Valve Timing System", IMechE 105/84, 1984, pp. 295-300.
Charlton, S., "A Continuously Variable Poppet Valve Actuator for Internal Combustion Engines", IMechE 82/86, 1986, pp. 157-195.
Thring, R., "The Flexible Diesel Engine", SAE Technical Paper Series 900175, Feb. 26-Mar. 2, 1990, pp. 31-39.
Mavinahally, N. et al., "Insulated Miller Cycle Diesel Engine", SAE Technical Paper Series 961050, Feb. 26-29, 1996, pp. 1-9.
Schechter, M. and Levin, M., "Camless Engine", SAE Technical Paper Series 960581, Feb. 25-29, 1996, pp. 17-31.
Miller, R., "Supercharging and Internal Cooling Cycle for High Output", ASME, 1947, pp. 453-464, vol. 69.
Mardell, J. and Cross, R., "An Integrated, Full Authority, Electrohydraulic Engine Valve and Diesel Fuel Injection System", SAE Technical Paper Series 880602, Feb.29-Mar. 4, 1988, pp. 1-10.
Gray, C., "A Review of Variable Engine Valve Timing", SAE Technical Series 880386, Feb.29-Mar. 4, 1988, pp. 1-11.
Asmus, T., "Perspectives on Applications of Variable Valve Timing", SAE Technical Series 910445, Feb. 5-Mar. 1, 1991, pp. 1-13.
Vormstein, W. and Pleimling, H., "Valve Timing and its Effect on the Performance of Medium-Speed Diesel Engines", 12th International Congress on Combustion Engines, 1977, pp. 1-41.
Chute, R., "Pressure Compounding a Four Cycle Diesel Engine", SAE Technical Paper Series 851520, Sep. 9-12, 1985, pp. 1-15.
Ishizuki, et al., "A New Type of Miller Supercharging System for High Speed Engines Part 2-Realization of High BMEP Diesel Engines", SAE Technical Series 851523, Sep. 9-12, 1985, pp. 1-10.
Leonard, H. et al., "Parametric Investigation of Variable Valve Timing Applied to a Turbocharged Diesel Engine", SAE Technical Paper Series 910453, Feb. 25-Mar. 1, 1991, pp. 1-9.
Leonard, H. et al., "Design and Analysis of a Roller Follower Variable Valve Timing System", SAE Technical Paper Series 930824, Mar. 1-5, 1993, pp. 61-70.
Tuttle, J., "Controlling Engine Load by Means of Late Intake-Valve Closing", SAE Technical Paper Series 800794, Jun. 9-13, 1980, pp. 1-13.
Bata, R. et al., "Variable Valve Timing for Diesel Compression Ratio Control", American Society of Mechanical Engineers, Internal Combustion Engine Division ICE, vol. 13, New Technology in Large Bore Engines, 1990, pp. 89-93.
Meier, E. and Bbaden, "The Miller System-a Possible Solution to Present Problems with Highly Charged Four-Stroke Engines", Brown Boveri Review, Apr. 1977, pp. 235-242, vol. 64. No. 4.
Bolton, B. and Assanis, D., "Optimum Breathing Strategies for Turbocharged Diesel Engines Based on the Miller Cycle Concept", American Society of Mechanical Engineers, Petroleum Division, Engineering Systems Design and Analysis, ASME, 1994, pp. 253-262, vol. 8: Part B.
"Internal-Combustion Engines," The New Encyclopaedia Britannica, 1987, pp. 474-485, Fifteenth edition, Chicago, IL.
Drei, V., "B230 Engines: Research and Experiments for Widening the Speed and Output Range and for Utilizing Alternative Fuels", Tech Paper 41336, 1983, pp. 703-728.
"Camlobe Phasing May Be the Key to Controlling Emissions", Automotive Engineer, Jun./Jul. 1990, pp. 26-27.
Berchtold, M., "Two Stage Supercharging with Comprex", 14th International Congress on Combustion Engines, 1981, pp. D111-1—D111-15.
Frankle, G., "Potential for Reducing Internal Engine Emissions in Modern Commercial Vehicle Diesel Engines", ACEA, Jul. 1-2, 1996, 28 pages.
Sakai, H. et al., "A New Type of Miller Cycle Diesel Engine", JSAE Review, Apr. 1988, pp. 4-9.
Choshi, M. et al., "Development of V6 Miller Cycle Engine", JSAE Review 15 9434154, 1994, pp. 195-200.
Nagao, F. et al., "Relation between Inlet Valve Closing Angle and Volumetric Efficiency of a Four-Stroke Engine", Bulletin of JSME 621.43.05, 1969, pp. 894-901.
Ma, T., "Recent Advances in Variable Valve Timing", pp. 235-252.
Hara, S. et al., "Effects of Intake-Valve Closing Timing on Spark-Ignition Engine Combustion", SAE Technical Paper Series 850074, Feb. 25-Mar. 1, 1985, pp. 1-10.
Stone, R. and Kwan, E., "Variable Valve Actuation Mechanisms and the Potential for their Application", SAE Technical Paper Series 890673, Feb. 27-Mar. 3, 1989, pp. 1-18.
Meacham, G., "Variable Cam Timing as an Emission Control Tool", ASE 700673, Aug. 24-27, 1970, pp. 1-16.
Siewart, R., "How Individual Valve Timing Events Affect Exhaust Emissions", ASE 710609, Jun. 7-11, 1971, pp. 1-17.
Freeman, M. and Nicholson, R., "Valve Timing for Control of Oxides of Nitrogen (NO)", ASE 720121, Jan. 10-14, 1972, pp. 1-10.
Schiele, C., "Design and Development of a Variable Valve Timing (VVT) Camshaft", ASE 740102, Feb. 25-Mar. 1, 1974, pp. 1-9.
Bates, B. et al., "Variable Displacement by Engine Valve Control", ASE Technical Paper Series 780145, Feb. 27-Mar. 3, 1978, pp. 1-12.
Siegla, D. and Siewert, R., "The Variable Stroke Engine—Problems and Promises", ASE Technical Paper Series 780700, Aug. 7-10, 1978, pp. 1-12.
Luria, D. et al., "The Otto-Atkinson Engine—A New Concept in Automotive Economy", SAE Technical Paper Series, 820352, Feb. 22-26, 1982, pp. 1-8.
Tuttle, J., "Controlling Engine Load by Means of Early Intake Valve Closing", SAE Technical Paper Series 820408, Feb. 22-26, 1982, pp. 1-17.
Asmus, T., "Valve Events and Engine Operation", SAE Technical Paper Series 820749, Jun. 7-10, 1982, pp. 1-14.
Herrin, R. and Pozniak D., "A Lost-Motion, Variable-Valve-Timing System for Automotive Piston Engines", SAE Technical Paper Series 840335, Feb. 27-Mar. 2, 1984, pp. 1-15.
Richman, R. and Reynolds, W., "A Computer-Controlled Poppet-Valve Actuation System for Application on Research Engines", SAE Technical Paper Series 840340, Feb. 27-Mar. 2, 1984, pp. 1-9.
Elrod, A., and Nelson, M., "Development of a Variable Valve Timed Engine to Eliminate the Pumping Losses Associated with Throttled Operation", SAE Technical Paper Series 860537, Feb. 24-28, 1986, pp. 1-8.
Nelson, M, and Elrod, A., "Continuous-Camlobe Phasing: An Advanced Valve-Timing Approach", SAE Technical Paper Series 870612, Feb. 23-27, 1987, pp. 1-10.
Freudenstein, F. et al., "The Synthesis and Analysis of Variable-Valve-Timing Mechanisms for Internal-Combustion Engines", SAE Technical Paper Series 880387, Feb. 29-Mar. 4, 1988, pp. 1-10.
Lenz, H. et al., "Variable Valve Timing-A Possibility to Control Engine Load without Throttle", SAE Technical Paper Series 880388, Feb. 29-Mar. 4, 1988, pp. 1-7.
Sapienza, S. et al., "An Electronically Controlled Cam Phasing System", SAE Technical Paper Series 880391, Feb. 29-Mar. 4, 1988, pp. 1-7.
Griffiths, P. and Mistry, K, "Variable Valve Timing for Fuel Economy Improvement—The Mitchell System", SAE Technical Paper Series 880392, Feb. 29-Mar. 4, 1988, pp. 1-9.
Entzminger, W., "Variable Valve Action (VVA) Through Variable Ratio Rocker Arms", SAE Technical Paper Series 880730, Feb. 29-Mar. 4, 1988, pp. 1-11.
Dreshner, T. and Barkan, P., "A Review and Classification of Variable Valve Timing Mechanisms", SAE Technical Paper Series 890674, Feb. 27-Mar. 3, 1989, pp. 1-14.
Saunders, R. and Abdul-Wahab, E., "Variable Valve Closure Timing for Load.Control and the Otto Atkinson Cycle Engine", SAE Technical Paper Series 890677, Feb. 27-Mar. 3, 1989, pp. 1-11.
Lenz, H. et al., "Initial Test Results of an Electro-Hydraulic Variable-Valve Actuation System on a Firing Engine", SAE Technical Paper Series 890678, Feb. 27-Mar. 3, 1989, pp. 1-8.
Grohn, M., "The New Camshaft Adjustment System by Mercedes-Benz—Design and Application in 4-Valve Engines", SAE Technical Paper Series 901727, Feb. 17-20, 1990, pp. 1-6.
Gould, L. et al., "Performance Evaluation of a Camless Engine Using Valve Actuators with Programmable Timing", SAE Technical Paper Series 910450, Feb. 25-Mar. 1, 1991, pp. 1-13.
Nagesh, M. et al., "Experimental Investigation on Extended Expansion Engine (EEE)", SAE Technical Paper Series 920452, Feb. 24-28, 1992, pp. 1-14.

Wilson, N. et al., "Asymmetric Valve Strategies and Their Effect on Combustion", SAE Technical Paper Series 930821, Mar. 1-5, 1993, pp. 29-40.
Hatano, K. et al., "Development of a New Multi-Mode Variable Valve Timing Engine", SAE Technical Paper Series 930878, Mar. 1-5, 1993, pp. 137-143.
Saunders. R. and Rabia, S., "Part Load Efficiency in Gasoline Engines", 1986, pp. 55-62, Mechanical Engineering Publications Limited, Suffolk, UK.
Stone, C. and Kwan, E., "Variable Valve Timing for IC Engines", Automotive Engineer, pp. 54-58.
Dreshner, T., "Multi-input CAM-Actuated Mechanisms and their Application to IC Engine Variable Valve Timing", A Dissertation Submitted to the Department of Mechanical Engineering and the Committee of Graduate Studies of Stanford University, Sep. 1988, No. 8906655, pp. 1-277.
Action Closing Prosecution in *Inter Partes* Reexamination for Control No. 95/000,049 dated Sep. 22, 2005; Patent Owner's Response to Action Closing Prosecution, filed Oct. 24, 2005, including Exhibit A: Second Declaration of Dr. John J. Moskwa, and Exhibit B: Second Declaration of Dr. Joel Hiltner, including Exhibit 1: U.S. Appl. No. 5,535,716, Exhibit 2: U.S. Appl. No. 4,084,557, Exhibit 3: Jul. 13, 2004 press release of IPO announcing National Inventor of the Year Award from the Intellectual Property Owner's Association, and Exhibit 4: U.S. Appl. No. 2005/0098162 A1, published on May 12, 2005; Comments of Requester Re Patent Owner's Response to Action Closing Prosecution, filed Nov. 23, 2005, including Supplemental Declaration of Jack A. Ekchian, PH.D. and Supplemental Declaration of David F. Merrion.
Action Closing Prosecution in *Inter Partes* Reexamination for Control No. 95/000,050 dated Sep. 22, 2005; Patent Owner's Response to Action Closing Prosecution, filed Oct. 24, 2005, including Exhibit A: Second Declaration of Dr. John J. Moskwa, and Exhibit B: Second Declaration of Dr. Joel Hiltner, including Exhibit 1: U.S. Appl. No. 5,535,716, Exhibit 2: U.S. Appl. No. 4,084,557, Exhibit 3: Jul. 13, 2004 press release of IPO announcing National Inventor of the Year Award from the Intellectual Property Owner's Association, and Exhibit 4: U.S. Appl. No. 2005/0098162 A1, published on May 12, 2005; Comments of Requester Re Patent Owner's Response to Action Closing Prosecution, filed Nov. 23, 2005, including Supplemental Declaration of Jack A. Ekchian, PH.D. and Supplemental Declaration of David F. Merrion.
Office Action dated Jul. 28, 2005 for U.S. Appl. No. 10/773,570.
Office Action dated Aug. 22, 2005 for U.S. Appl. No. 10/933,300.
Office Action dated Aug. 22, 2005 for U.S. Appl. No. 11/105,943.
Office Action dated Nov. 25, 2005 for U.S. Appl. No. 10/992,125.
Office Action dated Nov. 23, 2005 for U.S. Appl. No. 10/992,198.
English Language JPO Abstract of JP Publication No. 05106415 A1, Apr. 27, 1993.
English Language JPO Abstract of JP Publication No. 2000145484 A, May 26, 2000.
English Language JPO Abstract of JP Publication No. 2000120457 A, Apr. 25, 2000.
Communication from European Patent Office dated May 18, 2005 from EP Patent Application No. 03006344.0-2311 including Partial Search Report, Lack of Unity Opinion, and Annex to Search Report.
Request for *Ex Parte* Reexamination for U.S. Appl. No. 6,688,280, filed Jan. 18, 2006, including Declaration of Dr. Joel Hiltner with each Exhibit referred to in the Declaration.
Sakai, H. et al., "A Miller System Application for Efficient Diesel Power Units," The American Chemical Society, 1986, pp. 355-360.
Dickey et al., "Nox Control in Heavy-Duty Diesel Engines—What is the Limit?", SAE 980174, International Congress and Exposition, Detriot, Michigan, Feb 23-26, 1998, (16 pages).
"Jacobs Vehicle Systems, Future Technology: VVA, VVA—Variable Actuation Systems," http://www.jakebrake.com/content.php4?doc_uid=11 , pp. 1-2.
Richard Car's, "Paxman History Pages, Paxman Diesel Engines Since 1934," http://www.nelmesfsnet.co.uk/paxman/paxeng34.htm , pp.1-9.
"ALSTOM Engines, Paxman VP185," pp. 1-3, and 6.
Dipl.-Ing. Jörg Ballauf, "The 8$^{th}$ Annual Automobile and Engine Technology Cooloquium In Aachen An Overview," pp. 1-5.

"Sturman Industries, Leading The Mechanical World Into The Digital Age, Hydraulic Valve Actuation," http://www.sturmanindustries.com/main/hydraulicValveActuation.htm , pp. 1-2.
"Eaton Automotive—Engine Products, Variable Valve Actuation Devices," http://www.automotive.eaton.com/product/engine_controls/VVA.html , p. 1.
Lilly, L., "Diesel Engine Reference Book," 1984, Chapter 2, p. 3; Chapter 3, pp. 7-8.
Tennison, P., "An Experimental Investigation of the Effects of Common Rail Injection Parameters on Emissions and Performance in a High Speed Direct Injection Small Bore Diesel Engine," pp. 1-2.
Delphi, "Notas de prensa, Delphi Launches World's Most Advanced Common Rail Diesel System With Ford," Aug. 21, 2004, http://www.delphidieselsystems.com/diesel/es/ESDDSNewsItems4321.asp , pp. 1-3.
Isuzu, Press Release, "Isuzu New Direct Injection Diesel Lineup," Oct. 19, 1999, http://www.isuzu.co.jp/world/press/1999/p_1019_2.html , pp. 1-2.
Hara et al., "Effects of Intake-Valve Closing Timing on Spark-Ignition Engine Combustion", SAE Technical Paper Series 850074, Feb. 25-Mar. 1, 1985, pp. 1-10.
Communication/European Search Report dated Apr. 21, 2005 from EP Patent Application No. 04029382.1 of Clyde C. Bryant.
Zappa et al., CIMAC, "A 4-Stroke High Speed Diesel Engine with Two-Stage of Supercharging and Variable Compression Ratio," 13$^{th}$ International Congress on Combustion Engines, Vienna, 1979 (23 pages).
Office Action dated Feb. 17, 2006 in U.S. Appl. No. 10/733,570 (11 pages).
Amendment dated Jan. 27, 2006 in U.S. Appl. No. 10/733,570 (16 pages).
Obert, "Internal Combustion Engines, 2$^{nd}$ Edition, *Analysis and Practice*" (pp. 142-144, 153 and 154; Fig. 5-12) (1950).
Thring, R., "The Flexible Diesel Engine," SAE Technical Paper Series 900175, Feb. 26—Mar. 2, 1990 (p. 31, col. 1, 1$^{st}$ para.; col. 1, 2$^{nd}$ para., lns. 1-4; p. 31, col. 2, 2$^{nd}$ para., Ins. 9-11; col. 2, last para., Ins. 1-2; p. 31, col. 2, Table 1; p. 36, col. 1, first full paragraph; col. 2, last paragraph, Ins. 1-2) (pp. 31-39).
Further Translation of JP 07-091265, listed above (pp. 9-10, para. 15; pp. 11-12, para. 20; p. 13, para. 24) (30 pages).
Request for *Ex Parte* Reexamination Transmittal Form filed Jan. 20, 2006 (Control No. 90/007,885); Request for *Ex Parte* Reexamination filed Jan. 20, 2006; Claim Chart entitled: Comparison of '280 Patent Claims to Zappa et al.; executed Declaration of Dr. Joel Hiltner; Exhibits A-E; copy of U.S. Appl. No. 6,688,280; Form PTO SB/08 listing 3 documents cited in the Request and copies thereof; Order Granting/Denying Request for Ex Parte Reexamination for Control No. 90/007,885.
Ansdale, R.F., "The Varimax Engine", Automobile Engineer, Sep. 1968, pp. 382-387.
Miller, R., "Nordberg Supairthermal Diesel, Duafuel and Gas Engines Operating on the Miller Supercharging System", Petroleum Division Conference, ASME, Sep. 1951.
Brinson, L., "High Performance Gas Burning Engines", Seventh International Congress on Combustion Engines, CIMAC, Apr. 1965. pp. 603-622.
Azouz, M.R. et al., "Digital Control of Engine Valve Timing", Military Techinical College, Eygpt, Isata, 1987, pp. 193, 195-205.
D'Yachenko, V.G., "Internal Combustion Engines Operation Theory", Kiev, 1988.
"Valve Timing by Tensioner", Engineering Magazine, May 1986, pp. 343, 359.
Hutten, H., "Schnelle Motoren seziert und frisiert", Motorbuchverlag ISBN 3-87943-974-5, 1994, 2 pages.
Heywood, J., "Internal Combustion Engine Fundamentals", McGraw Hill International Editions, Automotive Technology Series, 1989, pp. 6-10.
Hilliard, J., and Springer, George S., "Fuel Economy in Road Vehicles Powered by Spark Ignition Engines", 1988, pp. 182-187.
"Internal Combustion Engines", Moscow, 1990, pp. 12-23.

Khutziev, A.I., "Internal Combustion Engines with Controlled Compression Mode", Moscow, 1986, pp. 64-69, 102-103.
Lenin, I.M., "Theory of Automotive and Tractor Engines", Moscow, 1969, pp. 34-41, 62-65, 364-367.
Miller, R., "A Low Temperature Supercharging System for Compression, Pilot Oil and Spark Ignition Engines", ASME, paper No. 57-A-250, 1957, pp. 1-10.
"High Powered Medium Speed Engines", The Motor Ship, Jul. 1975, pp. 135-173.
"Two-stage Turbocharging for GMT's B230 High Speed Engine", The Motor Ship. Sep. 1978, pp. 27-32, 67-68.
O'Flynn, G. et al., "Combustion Characteristics of an Otto-Atkinson Engine Using Late Inlet Valve Closing and Multi-Point Eletronic Fuel Injection", C389/041 IMechE, Paper No. 925107, 1992, pp. 329-338.
Petrov, A.K. et al., "Structural Design of Foreign Cars Produced at 1983", Annual Review, Part III, Automotive Engines, Moscow, 1983, pp. 3-19.
Rajikov, I. et al., "Automotive and Tractor Engines Structural Design", Moscow, 1986. pp. 18-27, 104-107.
Rannev, A. V., "Internal Combustion Engines for Construction Site and Road-Building Engines", Moscow, 1986, pp. 10-17.
Boggs, D.L. et al., "The Otto-Atkinson Cycle Engine-Fuel Economy and Emissions Results and Hardware Design", SAE Technical Paper Series 950089, Feb. 27-Mar. 2, 1995, pp. 1-13.
Scott, D., "Variable Valve Timing Has Electronic Control", SAE Automotive Engineering, May 1984, pp. 86-87.
Kentfield, J., "Diesel Engines with Extended Expansion Strokes", SAE Technical Paper Series 891866, Sep. 11-14, 1989, pp. 1-10.
Herzog, P. et al., "NOx Reduction Strategies for DI Diesel Engines", SAE Technical Paper Series 920470, Feb. 24-28, 1992, pp. 1-17.
Durnholz, M. et al., "Exhaust-Gas Recirculation—A Measure to Reduce Exhaust Emissions of DI Diesel Engines", SAE Technical Paper Series 920725, Feb. 24-28, 1992.
Stebler, H. et al., "Reduction of NOx Emissions of D.I. Diesel Engines by Application of the Miller-System: An Experimental and Numerical Investigation", SAE Technical Paper Series 960844, Feb. 26-29, 1996, pp. 1-11.
Kamo, R. et al., "Emissions Comparisons of an Insulated Turbocharged Multi-Cylinder Miller Cycle Diesel Engine", SAE Technical Paper Series 980888, Feb. 23-26, 1998, pp. 1-7.
Sapojhnikov, E.N., "International Combustion Engines", Kiev, 1979, pp. 8-17.
Torazza, G., "A Variable Lift and Event Control Device for Piston Engine Valve Operation", pp. 59-68, Italy.
Wallace, W., and Lux, F., "A Variable Compression Ratio Engine Development", SAE Transactions, Paper No. 762A, Oct. 1963, pp. 680-707.
"Volvo D6A250 Supercharger—Med Hog Prestanda Redan Fran Start", Volvo, 1996.
Vzorov, B.A., and Mordukhovich, M.M., "Forcing of Tractor Engines", Moscow, 1974, pp. 24-31.
Stojek, D., and Stwiorok, A., "Valve Timing with Variable Overlap Control", XX Fisita Congress, SAE 845026. May 1984, pp. 2.8-2.14.
Nagumo, S., et al., "Study of Fuel Economy Improvement Through Control of Intake Valve Closing Timing", 1994, pp. 169-172.
Zhang, F. et al., "Study on Miller Cycle Gas Engine for Generation—A Verification of Miller Cycle Effect", JSAE Convention, May 1995, vol. 951, No. 5, pp. 277-280, Paper No. 9534621.
Nakajima, Y., et al., "Study of Improving Fuel Economy by Early Intake-Valve-Closing Concept", No. 24, 1982, pp. 19-26.
Sakono, T., et al., "Mazada 2.5/ Inline 4W-T Type Turbo Diesel Engine", Mazda Motor Corporation, Dec. 1995, vol. 34, No. 435, pp. 93-99.
Sasaki, Y., "Komatsu Turbo and Turbo Diesel Engine Two Stage Turbocharging for Small Highspeed Diesel Engine", Komatsu Ltd., Dec. 1984, vol. 23 No. 301, pp. 19-24.
Kouichi, H., et al., "Development of Miller Cycle Gasoline Engine—Miller Cycle Engine with Late Intake Valve Closing and Lysholm Compressor", May 1993, Paper No. 9302088, pp. 201-204.

Ichimaru, K., et al., "A High Expansion Ratio Gasoline Engine with Intake Control Rotary Valve Installation", Oct. 1992, Paper No. 924008, pp. 29-32.
Koichi, H., et al., "KJ-ZEM Type Miller Cycle DOHC/2254 cc", Serial No. 0005, pp. 118-163.
Suzuki, T., et al., "Application of a Miller System to a Diesel Engine", Nov. 1991, Paper No. 912183, pp. 2.13-2.16.
Zhang, F., et al., "Effect of Miller Cycle on Gas Engine for Generation", JSAE Spring Convention, Jan. 1996, vol. 27, No. 1, Paper No. 9630723, pp. 79-83.
Ichimaru, K., et al., "Computer Simulation of Miller Cycle Gasoline Engines", JSAE Spring Convention, May 1995, vol. 951, No. 5, Paper No. 9534612, pp. 273-276.
Heuser, F., "Von der Fakuitat fur Maschinenwesen der Rheinisch-Westfallschen Technischen Hochschule Aachen genehimigte Dissertation zur Eriangung des akademischen Grades eines", A Dissertation Submitted to the , Jul. 8, 1988, pp. 1-99.
Haas, A. et al., "Mesures Pour Reduire Les Emissions NOx Des Moteurs Pour Vehicules Utilitaires" Le Moteur Diesel: Evolution Et Mutations, SIA—Societe Des Ingenieurs De L'Automobile, Apr. 10-11, 1996, pp. 1-16.
Montagne, X. et al., "Analyse De La Sensibilite Aux Parametres Gazole D'Un Moteur Diesel D'Automobile A Injection Directe" Le Moteur Diesel: Evolutions Et Mutations, SIA—Societe Des Ingenieurs De L'Automobile, Apr. 10-11, 1996, pp. 1-16.
Herzog, P., "HSDI-Diesel-Euro III Technologies", Le Moteur Diesel: Evolution Et Mutations, SIA—Societe Des Ingenieurs De L'Automobile, Apr. 1996, pp. 1, 4, 8.
Feucht, H. et al., "Development Of The New Turbocharged 2.5I Four Valves Prechamber Diesel Engine For The Mercedes Benz Compact Class", Le Moteur Diesel: Evolution Et Mutations, SIA—Societe Des Ingenieurs De L'Automobile, Apr. 10-11, 1996, 15 pages.
Brun, R., "Science et technique du moteur diesel industriel et de transport", Institut Francais Du Petrole, 1981, 7 pages.
Briand, J., "Diesels marins description et fonctionnement" Masson, Paris, 1992, pp. 137-138.
"Moteurs Diesel", E.T.A.I., 1990, p. 330.
Foy, H., "Technologie Du Turbocompresseur", E.T.A.I., pp. 62, 65, 140.
Suzuki, T., et al. "Development of Diesel Combustion for Commercial Vehicles", Future Diesel Engines, Society of Automotive Engineers, Inc., SAE 972685, 1997, pp. 47-65.
Iwata, N., et al, "Improvement of anit-knocking performance by supercharged Miller-Cycle engine—RAM-Pulsation effects on anti-knocking performance by Miller-Cycle", Mazda Motor Corporation, May 1995, No. 9534603.
Haugen, D., "Performance And Combustion Effects Of Phased Late Intake Closure On A Two Intake Valve Engine", A Thesis Submitted to the Faculty of the Graduate School of the University of Minnesota, Dec. 1995, pp. 1-84.
Boggs, D. et al., "A Small Displacement DI Diesel Engine Concept for High Fuel Economy Vehicles", Future Diesel Engines, Aug. 6-8, 1997, SAE SP-1287, SAE No. 972680, pp. 1-97.
Kesgin, Ugur, "Efficiency improvement and NOx emission reduction potentials of two-stage turbocharged Miller cycle for stationary natural gas engines", International Journal of Energy Research, 2005, vol. 29, pp. 189-216.
Communications from European Patent Office dated Apr. 21, 2005 and Feb. 23, 2005 from EP Patent Application Nos. 04029382.1 and 04029382.1-2311 including Partial Search Report, Lack of Unity Opinion, and Annex to Search Report.
Office Action dated Feb. 17, 2006 for U.S. Appl. No. 10/733,570.
Reply to Office Action dated Feb. 22, 2006 for U.S. Appl. No. 10/933,300.
Office Action dated Mar. 16, 2006 for U.S. Appl. No. 10/992,070.
Office Action dated Mar. 15, 2006 for U.S. Appl. No. 10/992,071.
Office Action dated Mar. 29, 2006 for U.S. Appl. No. 10/992,074.
Office Action dated Mar. 17, 2006 for U.S. Appl. No. 10/992,137.
Reply to Office Action dated Apr. 20, 2006 for U.S. Appl. No. 10/992,198.
Office Action dated Apr. 12, 2006 for U.S. Appl. No. 10/992,857.
Office Action dated Mar. 29, 2006 for U.S. Appl. No. 10/992,866.

Office Action dated Apr. 18, 2006 for U.S. Appl. No. 10/992,897.
Office Action dated Apr. 18, 2006 for U.S. Appl. No. 10/993,065.
Reply to Office Action dated Feb. 22, 2006 for U.S. Appl. No. 11/105,943.
Office Action dated Feb. 8, 2006 for U.S. Appl. No. 90/007,885.
Reply to Office Action dated May 25, 2006 for U.S. Appl. No. 10/992,125.
Okamoto, Kazuhisa et al., "Development of a High-Performance Gas Engine Operating at a Stoichiometric Condition-Effect of Miller Cycle and EGR", CIMAC Congress 1998, pp. 1345-1360.
Okamoto, Kazuhisa et al., "Effect of EGR on The Late Intake-Valve Closing Miller Cycle for Natural Gas Engines", JSAE 983420 vol. 29, No. 2, Apr. 1998, pp. 17-22.
Roda, Franco, "Variable Valve Timing—A Means of Optimizing Turbocharged Four-Stroke Diesel Engines", MTZ "Motortechnische Zeitschrift" (Engine Technology Magazine) 49, 1988, pp. 303-308.
Akiyama, Mamoru et al., "An Elegant Solution for Vehicular Diesel's Emission and Economy—Hybrid EGR System", SAE 960842, pp. 1-5.
Okamoto, Kazuhisa et al., "Developement of a Late Intake-Valve Closing (LIVC) Miller Cycle for Stationary Natural Gas Engines—Effect of EGR Utililization", SAE 972948, 1997, pp. 87-99.
Zhang, Fu-Rong et al., "Methods of Increasing the BMEP (Power Output) for Natural Gas Spark Ignition Engines", SAE 981385, May 4-6, 1998, pp. 11-19.
Zhang, Fu-Rong et al., "Improvement of BMEP for Natural Gas Fueled Spark Ignition Engines by Using Miller Cycle and EGR", JSAE 9834196 vol. 29, No. 2, Apr. 1998, pp. 11-16.
Nagumo, Shinichi et al., "Study of Fuel Economy Improvement through Control of Intake Valve Closing Timing: Cause of Combustion Deterioration and Improvement", JSAE 9439311, JSAE Review 16 (1995), pp. 13-19.
"Optimierung von Arbeits—und Brennverfahren fur grobere Dieselmotoren mit Common-Rail-Einspritzung", MTZ Motortechnische Zeitschrift 61 (2000) 4, pp. 248-257.
Clarke, Damien et al., "The Simulation, Implementation and Analysis of the Miller Cycle Using an Inlet Control Rotary Valve", SAE Technical Paper Series 970336, Feb. 24-27, 1997, pp. 61-70.
Sakai, Hiroshi et al., "A New Type of Miller Supercharging System for High-Speed Engines—Part 1 Fundamental Considerations and Application to Gasoline Engines", SAE 851522, Sep. 9-12, 1985, pp. 1-7.
Narusawa, Kazuyuki, "An EGR Control Method for Heavy-Duty Diesel Engines under Transient Operations", SAE Technical Paper Series 900444, Feb. 26-Mar. 2, 1990, pp. 1-14.
Gould, Larrie et al., "Electronic Valve Timing: The impact of electronic valve timing on engine 'breathing' produces performance capability radically different from any traditional internal combustion engine", SAE Automotive Engineering vol. 99, No. 4, Apr. 1991, pp. 19-24.
Taylor, Charles Fayette, "The Internal-Combustion Engine in Theory and Practice: vol. 1: Thermodynamics, Fluid, Flow, Performance", Second Edition, Revised, 1985, pp. 8, 362, 392-394, 456-458, 489-491.
Taylor, Charles Fayette, "The Internal-Combustion Engine in Theory and Practice: vol. 2: Combustion, Fuels, Materials, Design", Revised Edition, 1985, pp. 7, 29-31, 71-72, 104, 117, 233-234, 367, 402-409, 422.
Wadman, Bruce W., "Tandem Turbocharging Delivers 250 BMEP Rating", Diesel and Gas Turbine Progress, Jul. 1967, vol. 23, No. 7, pp. 50-51.
Wadman, Bruce W., "Nordberg Centrifugal Gas Compressor Unit", Diesel and Gas Engine Progress, Apr. 1955, pp. 24-26.
Office Action dated Jul. 11, 2006 for U.S. Appl. No. 10/992,125.
Substitute Amendment After Final filed on Nov. 9, 2006 for U.S. Appl. No. 11/236,765.
Office Action dated Sep. 12, 2006 for U.S. Appl. No. 11/236,765.
Amendment and Response to May 23, 2006 Office Action filed on Aug. 23, 2006 for U.s. Appl. No. 10/996,695.
Notice of Allowance and Notice of Allowability dated Sept. 20, 2006 for U.S. Appl. No. 10/996,695.

AIR AND FUEL SUPPLY SYSTEM FOR A COMBUSTION ENGINE

RELATED APPLICATIONS

This application is a continuation-in-part of U.S. patent application Ser. No. 10/933,300, filed Sep. 3, 2004, which is a continuation-in-part of U.S. patent application Ser. No. 10/733,570, filed Dec. 12, 2003, which is a continuation of U.S. patent application Ser. No. 10/143,908, filed May 14, 2002, now U.S. Pat. No. 6,688,280. This application is also a continuation-in-part of U.S. patent application Ser. No. 10/697,437, filed Oct. 31, 2003 now U.S. Pat. No. 7,007,643. This application is also a continuation-in-part of U.S. patent application Ser. No. 10/733,570, filed Dec. 12, 2003, which is a continuation of U.S. patent application Ser. No. 10/143,908, filed May 14, 2002, now U.S. Pat. No. 6,688,280.

The entire disclosure of each of the U.S. patent applications mentioned in the preceding paragraph is incorporated herein by reference. In addition, the entire disclosure of each of U.S. Pat. Nos. 6,651,618 and 6,688,280 is incorporated herein by reference.

TECHNICAL FIELD

The present invention relates to a supply system for an internal combustion engine and, more particularly, to a fuel and air supply system for an internal combustion engine.

BACKGROUND

The operation of an internal combustion engine, such as, for example, a diesel, gasoline, or gaseous fuel drive engine such as a natural gas engine, may cause the generation of undesirable emissions. These emissions, which may include particulates and nitrous oxide (NOx), are generated when fuel is combusted in a combustion chamber of the engine. An exhaust stroke of an engine piston forces exhaust gas, which may include these emissions, from the engine. If no emission reduction measures are in place, these undesirable emissions will eventually be exhausted to the environment.

Research is currently being directed towards decreasing the amount of undesirable emissions that are exhausted to the environment during the operation of an engine and on improving engine efficiency. One such approach involves adjusting the actuation timing of the engine valves. For example, the actuation timing of the intake and exhaust valves may be modified to implement a variation on the typical diesel or Otto cycle known as the Miller cycle. In a "late intake" type Miller cycle, the intake valves of the engine are held open during a portion of the compression stroke of the piston. By holding the intake valves open during a portion of the compression stroke of the piston, the compression ratio of the engine is reduced while maintaining a high expansion ratio, which results in a temperature reduction of the fuel/air mixture within the combustion chamber. This improved thermal efficiency reduces the emission of NOx.

One system utilized to vary intake valve timing is described in U.S. Pat. No. 6,237,551 (the '551 patent) issued to Macor et al. on May 29, 2001. The '551 patent describes a diesel engine having an intake valve actuated by a cam of a cam shaft. A chamber of fluid under pressure is associated with each intake valve, located between the intake valve and the cam, and connected through a solenoid valve to an outlet channel. An electronic control means varies the opening time of the intake valve by opening the solenoid valve.

Although the valve actuation system of the '551 patent may provide some flexibility in the opening timing of the intake valve, it may be problematic. For example, hydraulic variable timing solutions may experience some inconsistencies at cold temperatures, for example, during cold engine start and during cold operating conditions. Since fluid such as, for example, lubricating oil, is may be more viscous when cold, the more viscous fluid may have more difficulty flowing through smaller conduits that may be used to operate a variable valve system, possibly resulting in unpredictable operation.

Further reduction in the amount of pollutants emitted to the atmosphere and improvement in engine efficiency can be realized by combining a charged air induction system with variable valve timing. One such system is described in U.S. Pat. No. 6,273,076 (the '076 patent) issued to Beck et al. on Aug. 14, 2001. The '076 patent describes an engine having camless electro-hydraulically controlled intake valves capable of modulating a supply of air to a combustion chamber. The engine of the '076 patent also describes a combined supercharger/turbocharger assembly for directing charged air to the combustion chamber.

Although the engine of the '076 patent may reduce the amount of pollutants emitted from an engine by combining a charged induction system with variable valve timing, the engine of the '076 patent may also be problematic. In addition to the difficulties that may be associated with hydraulically controlled valve actuation, the engine of the '076 patent may also have low efficiency because the air induction system includes a supercharger. Specifically, the supercharger does not utilize the energy available in the exhaust flow from the engine of the '076 patent and requires additional driving energy from the engine to turn the compressor.

The disclosed air and fuel supply system is directed to overcoming one or more of the problems set forth above.

SUMMARY OF THE INVENTION

In one aspect, the present disclosure is directed to an internal combustion engine. The internal combustion engine includes an engine block defining at least one cylinder and a head connected with said engine block. The head has an air intake port and an exhaust port. The internal combustion engine also includes a piston slidable in the cylinder and a combustion chamber being defined by said head, said piston, and said cylinder. The internal combustion engine further includes an air intake valve movable to open and close the air intake port and an air supply system including at least one turbocharger fluidly connected to the air intake port. The internal combustion engine additionally includes a fuel supply system operable to inject fuel into the combustion chamber, a cam assembly selectively mechanically linked to the air intake valve to move the air intake valve, and an electromagnetic actuator configured to decouple the cam assembly from the air intake valve and control movement of the air intake valve.

In another aspect, the present disclosure is directed to a method of operating an internal combustion engine having at least one cylinder and a piston slidable in the cylinder. The method includes supplying pressurized air from an intake manifold to an air intake port of a combustion chamber in the cylinder. The also includes operating an air intake valve to open the air intake port to allow pressurized air to flow between the combustion chamber and the intake manifold substantially during a majority portion of a compression stroke of the piston. The method further includes controlling an electromagnetic actuator to close the air intake port to prohibit pressurized air from flowing between the combustion chamber and the intake manifold.

DETAILED DESCRIPTION

Figure 1:
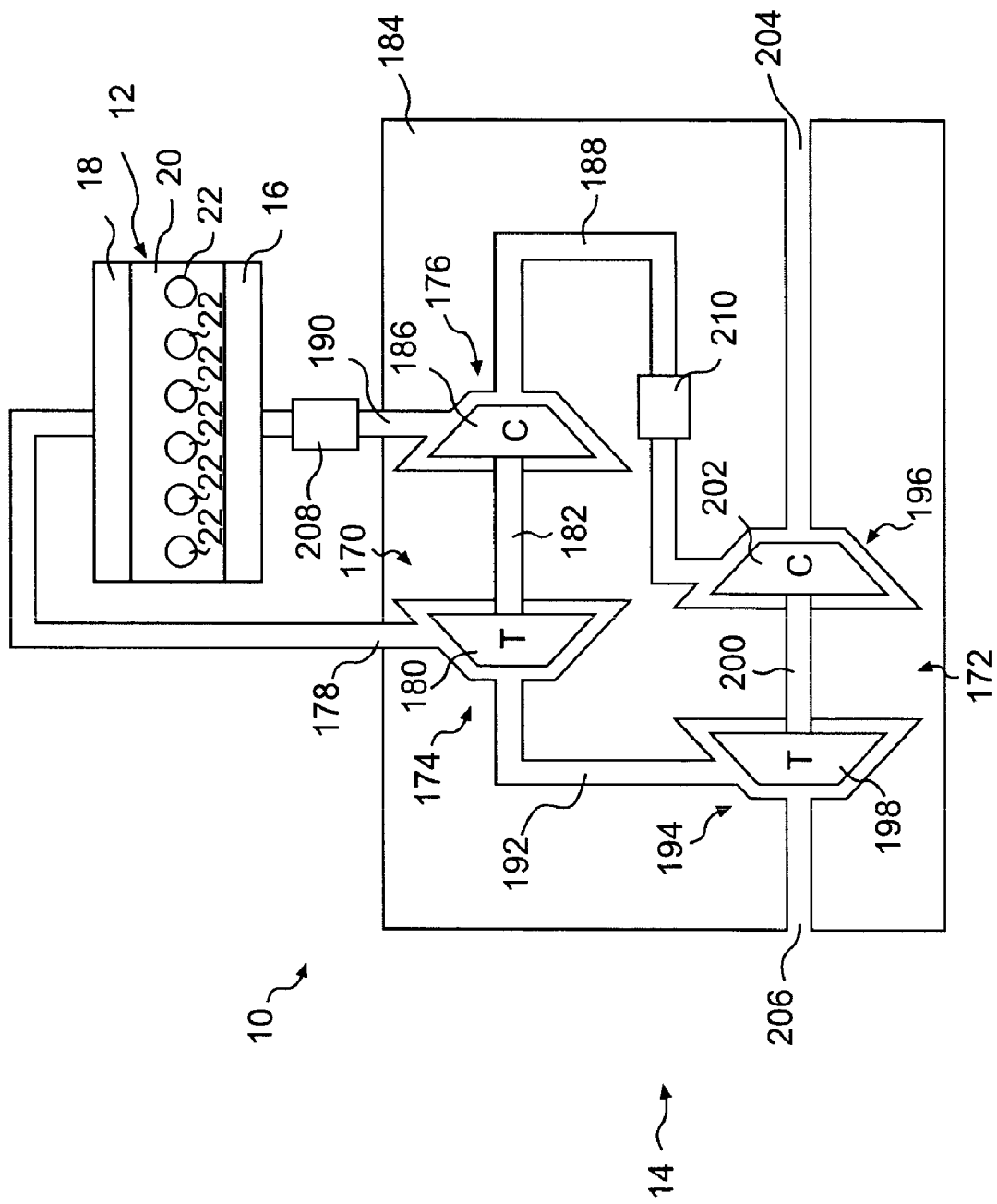
FIG. 1 is a diagrammatic illustration of an exemplary disclosed internal combustion engine having an air supply system.

FIG. 1 illustrates an exemplary power system 10 having internal combustion engine 12, an air supply system 14, and intake and exhaust manifolds 16 and 18 fluidly connecting internal combustion engine 12 and air supply system 14. Internal combustion engine 12 may include an engine block 20 defining a plurality of cylinders 22, the number of which depends upon the particular application. In one example internal combustion engine 12 may include six cylinders 22, however, it is contemplated that internal combustion engine 12 may include any number of cylinders 22 and that cylinders 22 may be disposed in an in-line configuration, a V-configuration, or any other suitable configuration. It should be appreciated that internal combustion engine 12 may be any type of internal combustion engine such as, for example, a diesel engine, a gasoline engine, a gaseous fuel driven engine such as a natural gas engine, or any other type of engine known in the art.

Figure 2:
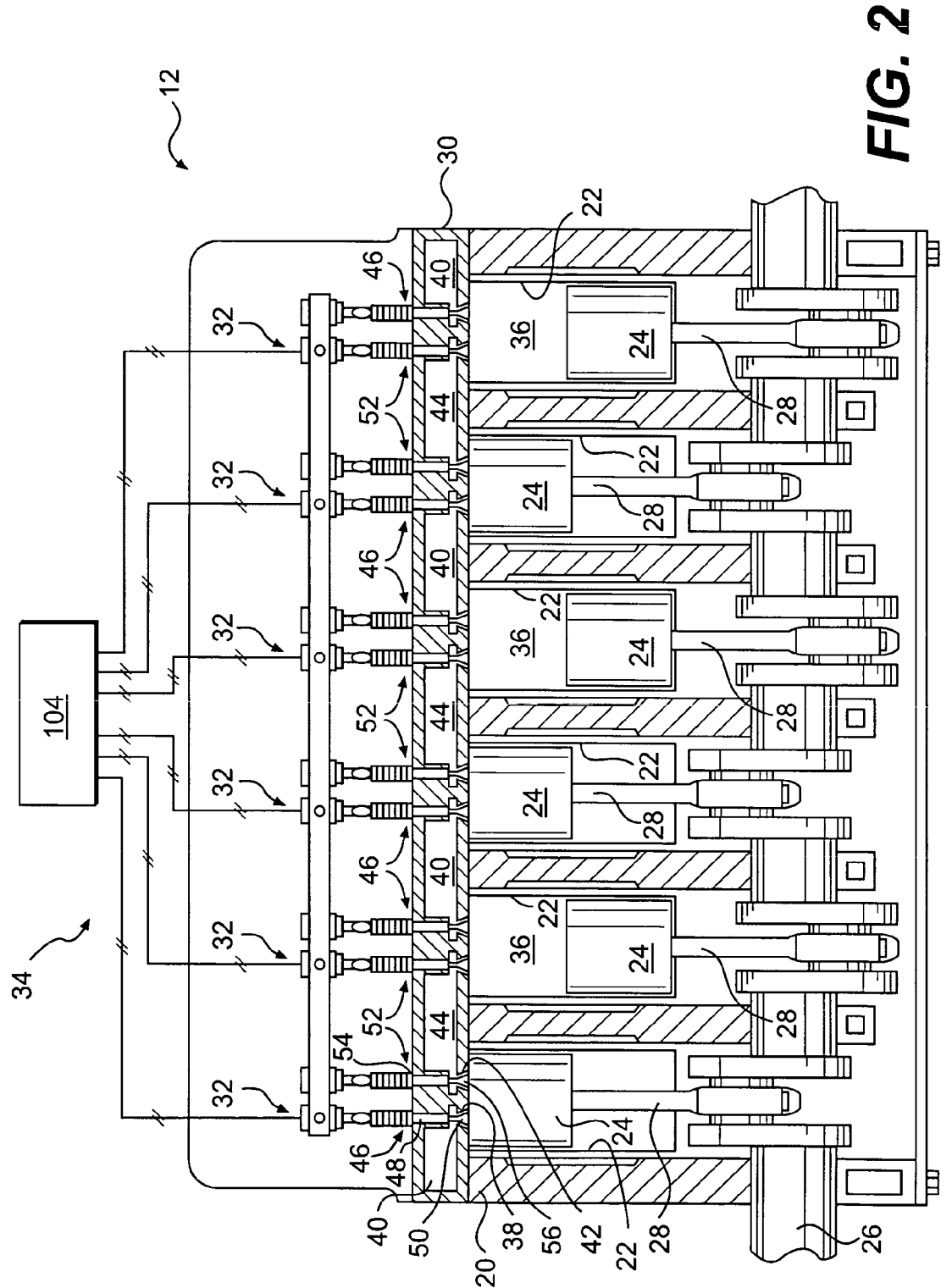
FIG. 2 is a cutaway illustration of the internal combustion engine of FIG. 1.

As illustrated in FIG. 2, internal combustion engine 12 may include numerous additional components and systems that cooperate to generate a power output. In particular, internal combustion engine 12 may include a piston 24 slidably disposed within each of the plurality of cylinders 22, a crankshaft 26, a connecting rod 28 operatively connecting each piston 24 with crankshaft 26, a cylinder head 30 associated with each of cylinders 22, a series of valve actuation assemblies 32, and a control system 34.

Crankshaft 26 may be rotatably disposed within engine block 20 and operably connected to each piston 24. In particular, one connecting rod 28 may couple each piston 24 to crankshaft 26 so that a sliding motion of pistons 24 within cylinders 22 results in a rotation of crankshaft 26. Similarly, a rotation of crankshaft 26 may result in a sliding motion of pistons 24. For example, an uppermost position of each piston 24 in cylinder 22 may correspond to a top dead center position of crankshaft 26, and a lowermost position of each piston 24 in cylinder 22 may correspond to a bottom dead center position of crankshaft 26.

Internal combustion engine 12 may be a four-stroke engine, wherein piston 24 reciprocates between the uppermost position and the lowermost position during a combustion (or expansion) stroke, an exhaust stroke, and intake stroke, and a compression stroke. As piston 24 reciprocates between the upper most and lower most positions, crankshaft 26 may rotate from the top dead center position to the bottom dead center position during the combustion stroke, from the bottom dead center to the top dead center during the exhaust stroke, from top dead center to bottom dead center during the intake stroke, and from bottom dead center to top dead center during the compression stroke. Each stroke of piston 24 correlates to about 180° of crankshaft rotation, or crank angle. Thus, the combustion stroke may begin at about 0° crank angle, the exhaust stroke at about 180°, the intake stroke at about 360°, and the compression stroke at about 540°.

Each cylinder head 30 may be connected with engine block 20 and associated with one cylinder 22 to form a combustion chamber 36. It is also contemplated that one cylinder head 30 may alternatively be associated with multiple cylinders 22 to form multiple combustion chambers 36. Each cylinder head 30 may define an exhaust port 38 associated with each cylinder 22 that leads from the respective cylinder 22 to an exhaust passageway 40, and an intake port 42 that leads from the respective cylinder 22 to an intake passageway 44. Exhaust passageway 40 may direct exhaust fluid from exhaust port 38 to exhaust manifold 18 (referring to FIG. 1), while intake passageway 44 may provide fluid, for example air or a fuel/air mixture, from intake manifold 16 (referring to FIG. 1) to intake port 42. It is contemplated that cylinder head 30 may define multiple exhaust ports 38 and/or multiple intake ports 42 for each cylinder 22. Intake manifold 16 and exhaust manifold 18 may be constructed as a single integral parts or, alternatively, may be constructed as multi-part manifolds, depending upon the particular application.

Each valve actuation assembly 32 may be configured to open and close at least one exhaust port 38 and/or at least one intake port 42. Specifically, internal combustion engine 12 may include an exhaust valve 46 disposed within each exhaust port 38. Each exhaust valve 46 may include a valve stem 48 having a valve head 50, head 50 being sized and arranged to selectively close exhaust port 38. Similarly, internal combustion engine 12 may include an intake valve 52 with a valve stem 54 and a head 56 at a first end of valve stem 54, head 56 being sized and arranged to selectively close intake port 42. As described in greater detail below, each exhaust valve 46 and intake valve 52 may be actuated to move or "lift" heads 50 and 56 to thereby open the respective exhaust and intake ports 38 and 42. In a cylinder 22 having a pair of exhaust valves 46 and a pair of intake valves 52, each of the pairs of exhaust and intake valves 46, 52 may be actuated by a single valve actuation assembly 32 or by a pair of valve actuation assemblies 32.

Figure 3:
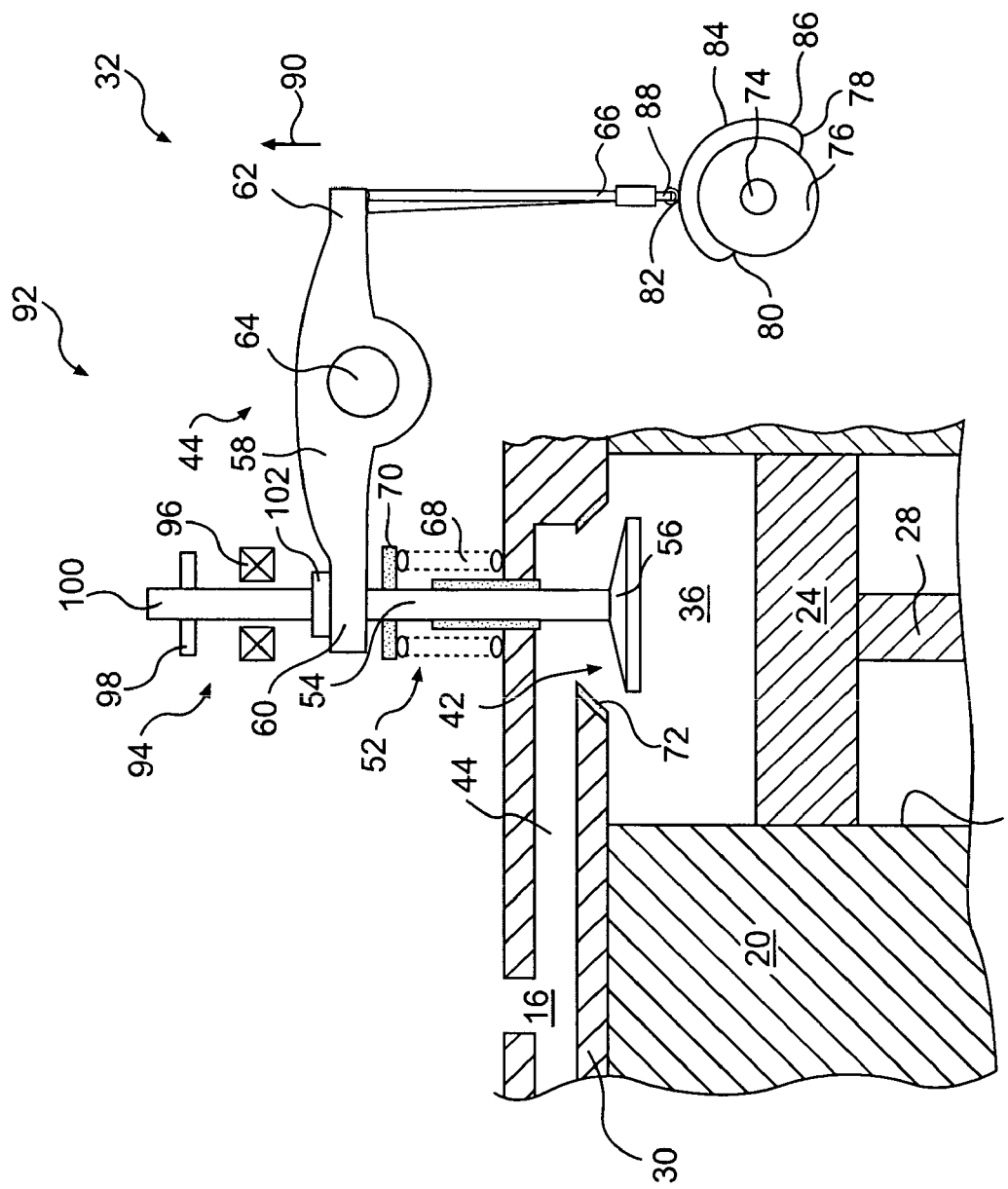
FIG. 3 is a cutaway view of a portion of the internal combustion engine of FIG. 1.

As illustrated in FIG. 3, each valve actuation assembly 32 may include a rocker arm 58 having a first end 60, a second end 62, and a pivot point 64. The first end 60 of rocker arm 58 may operatively engage head 56 of intake valve 52 through valve stem 54. The second end 62 of rocker arm 58 may be operatively associated with a pushrod 66. Intake valve 52 may be movable between a first position permitting flow from intake passageway 44 to enter combustion chamber 36 and a second position substantially blocking flow from intake passageway 44 to combustion chamber 36. It is contemplated that pushrod 66 may be omitted, if desired.

Valve actuation assembly 32 may also include a valve spring 68 configured to bias intake valve 52. Specifically, valve spring 68 may act on valve stem 54 through a locking nut 70 to move head 56 of intake valve 52 relative to cylinder head 30. In one embodiment, valve spring 68 may bias head 56 of intake valve 52 into the first position, where head 56 engages a valve seat 72 within cylinder head 30 to prevent a flow of fluid relative to intake port 42. Head 56 of intake valve 52 may be movable against the bias of valve spring 68 toward a second position where head 56 is away from valve seat 72 to allow a flow of fluid relative to intake port 42.

Internal combustion engine 12 may also include a camshaft 74 operatively connected to crankshaft 26 and carrying a cam 76 with one or more lobes 78. Camshaft 74 may be operatively connected with crankshaft 26 in any manner readily apparent to one skilled in the art where a rotation of crankshaft 26 may result in a corresponding rotation of the camshaft 74. For example, camshaft 74 may be connected to crankshaft 26 through a gear train (not shown) that reduces the rotational speed of camshaft 74 to approximately one half of the rotational speed of crankshaft 26.

Intake valve 52 may be arranged to operate cyclically based on the configuration of cam 76, lobes 78, and the rotation of camshaft 74 to achieve a desired predetermined intake valve timing. As will be explained in greater detail below, the shape of cam lobes 78 on cam 76 may determine, at least in part, the actuation timing of head 56 of intake valve 52. The distance between an outer edge of lobes 78 may vary between a first lobe position 80, a second lobe position 82, a third lobe position 84, and a fourth lobe position 86. It is contemplated that cam 76 may include a greater number of cam lobes and/or a cam lobe having a different configuration depending upon the desired intake valve actuation timing.

A rotation of cam 76 may cause a cam follower 88 and associated pushrod 66 to periodically reciprocate between an upper position and a lower position. The reciprocating movement of pushrod 66 may cause rocker arm 58 to pivot about pivot point 64. When pushrod 66 moves in the direction indicated by an arrow 90, rocker arm 58 may pivot and move first end 60 in the opposite direction. The movement of first end 60 may cause each intake valve 52 to lift from valve seat 72 and open intake port 42. As cam 76 continues to rotate, valve spring 68 may act on first end 60 of rocker arm 58 to return each intake valve 52 to the second or closed position. In one embodiment, one of lobes 78 may be configured to operate intake valve 52 in a conventional Otto or diesel cycle, whereby intake valve 52 moves to the second position from between about 10° before bottom dead center of the intake stroke and about 10° after bottom dead center of the compression stroke. In this manner, the shape and orientation of the cam 76 controls the timing of the actuation of the intake valves 52.

Cam 76 may be configured to coordinate the actuation of the intake valves 52 with the movement of pistons 24. For example, each intake valve 52 may be actuated to open intake port 42 when the associated piston 24 is withdrawing within cylinder 22 to allow air to flow from intake passageway 44 into the combustion chamber 36.

Exhaust valve 46 (referring to FIG. 2) may be configured in a manner similar to intake valve 52 and may be operated by one of the lobes 78 of cam 76. Alternatively, a second cam (not shown) may be connected to crankshaft 26 to control the actuation timing of the exhaust valve 46. Exhaust valve 46 may be actuated to open the exhaust port 38 when piston 24 is advancing within cylinder 22 to allow exhaust to flow from the cylinder 22 into exhaust passageway 40.

Valve actuation assembly 32 may also include an electronically operated variable valve closing mechanism 92 that is structured and arranged to selectively interrupt cyclical movement of intake valve 52 initiated by cam 76. For example, variable valve closing mechanism 92 may include an electromagnetic actuator 94, for example, a latching solenoid, disposed at the first end 60 of rocker arm 58. Electromagnetic actuator 94 may include a solenoid coil 96 and an armature 98 coupled with a core 100. Armature 98 and core 100 may be slidably movable through solenoid coil 96 such that an end 102 of core 100 operably engages first end 60 of rocker arm 58.

Control system 34 may include a controller 104 (referring to FIG. 2) electrically connected to variable valve closing mechanism 92. Controller 104 may be configured to control operation of variable valve closing mechanism 92 based on one or more current engine operating conditions. In particular, controller 104 may be programmed to receive information from one or more sensors (not shown) operatively connected with internal combustion engine 12. Each of the sensors may be configured to sense one or more operational parameters of internal combustion engine 12. For example, internal combustion engine 12 may be equipped with sensors configured to sense one or more of the following: a temperature of an engine coolant, a temperature of internal combustion engine 12, an ambient air temperature, an engine speed, a load on internal combustion engine 12, and an intake air pressure. It is contemplated that controller 104 may also be configured to control operation of variable valve closing mechanism 92 based on instructions received from an operator. It should be appreciated that the functions of controller 104 may be performed by a single controller or by a plurality of controllers. Controller 104 may include an electronic control module (not shown) that has a microprocessor and a memory. As is known to those skilled in the art, the memory may be connected to the microprocessor and configured to store an instruction set and variables. Associated with the microprocessor and part of the electronic control module may be various other known circuits such as, for example, power supply circuitry, signal conditioning circuitry, and solenoid driver circuitry, among others.

Figure 4:
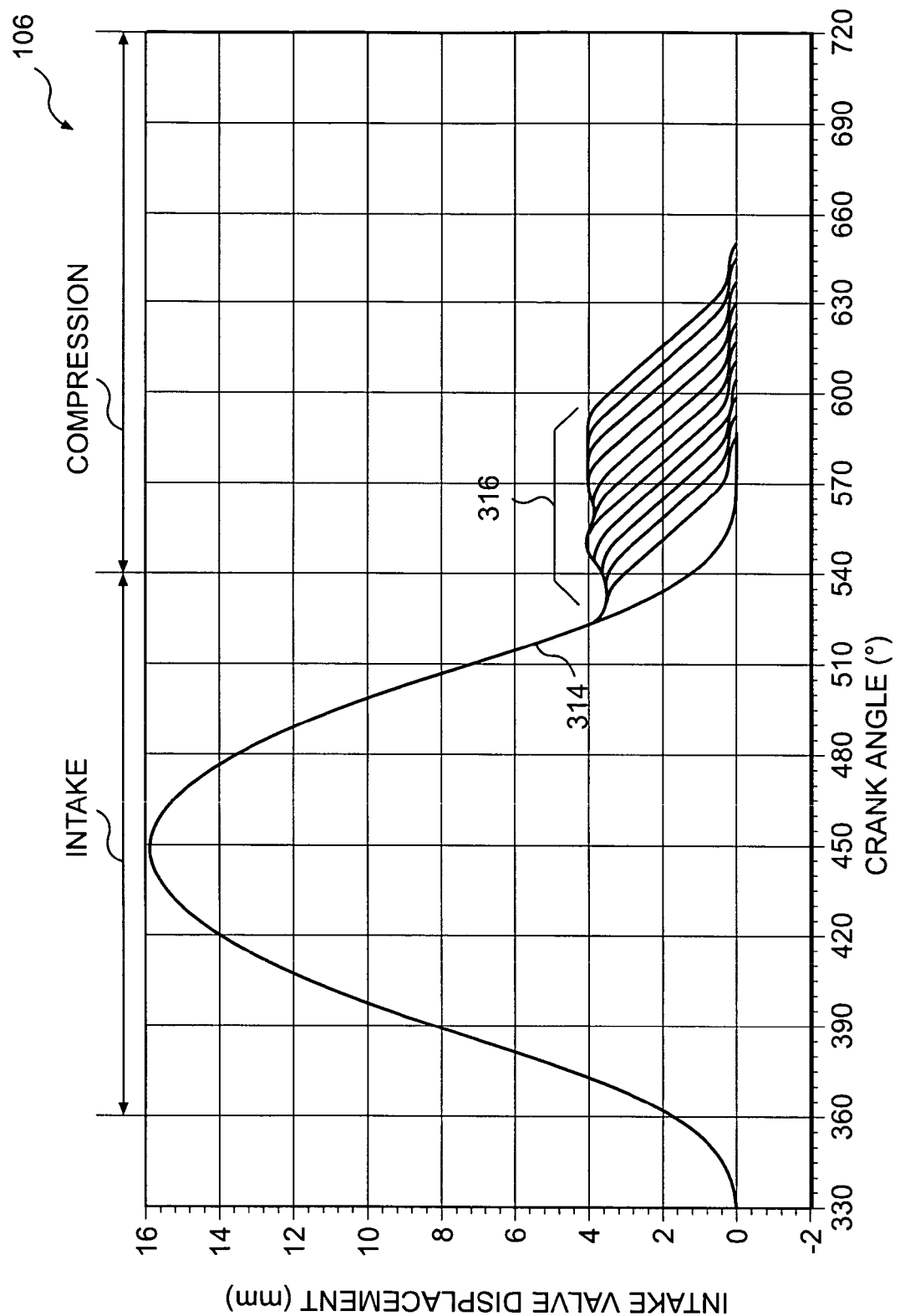
FIG. 4 is a graph illustrating exemplary disclosed valve actuations as a function of engine crank angle.

Control system 34 may be further equipped with a sensor configured to monitor the crank angle of crankshaft 26 to thereby determine the position of pistons 24 within their respective cylinders 22. The crank angle of crankshaft 26 may also be related to actuation timing of intake valves 52 and exhaust valves 46. For example, exhaust valve actuation may be timed to substantially coincide with the exhaust stroke of piston 24 and, as illustrated in an exemplary graph 106 of FIG. 4, intake valve actuation 110 may be timed to substantially coincide with the intake stroke of the piston 24. FIG. 4 illustrates valve lift for an exemplary late closing 316 of intake valve 52 and an exemplary conventional closing 314.

Intake valve 52 may begin to open at about 360° crank angle, that is, when the crankshaft 26 is at or near a top dead center position of the intake stroke. The closing of intake valve 52 may be selectively extended by the engagement of end 102 of core 100 with first end 60 of rocker arm 58 from the cyclical closing initiated by the rotation of cam 76. That is, after intake valve 52 is lifted (i.e., opened by cam 76), and when cam 76 is no longer holding intake valve 52 open, variable valve closing mechanism 92 may hold intake valve 52 open for a desired period. The desired period may change depending on the desired performance of internal combustion engine 12. In one example, the closing of intake valve 52 may be extended from about 540° crank angle, that is, when the crank shaft is at or near a bottom dead center position of the compression stroke, to about 650° crank angle, that is, about 70° before top center of the combustion stroke. Thus, intake valve 52 may be held open for a majority portion of the compression stroke, that is, for the first half of the compression stroke and a portion of the second half of the compression stroke. It is contemplated that electromagnetic actuator 92 may keep intake valve 52 open at an intermediate position between fully open and fully closed for a period of time or may allow continuous movement of intake valve 52 with a delayed and/or slowed closing.

Although some examples described herein involve late intake valve closure, it should be understood that certain examples in accordance with the present invention might involve engine operation where both late and early intake valve closure is selectively provided, or engine operation where only early intake valve closure is selectively provided. For example, in some exemplary engines cam 76 could have an alternative profile providing cyclical early intake valve closure and the variable valve closing mechanism 92 may be controlled to selectively delay the intake valve closing so that the delayed intake valve closing occurs before, at, and/or after bottom dead center of the intake stroke. It is also contemplated that the movement of intake valves 52 may be both opened and closed by variable valve closing mechanism 92, without cam 76 affecting the movement of intake valve 52 at all. In such an instance, cam 76, pushrod 66, and rocker arm 58 may be omitted entirely.

Figure 5:
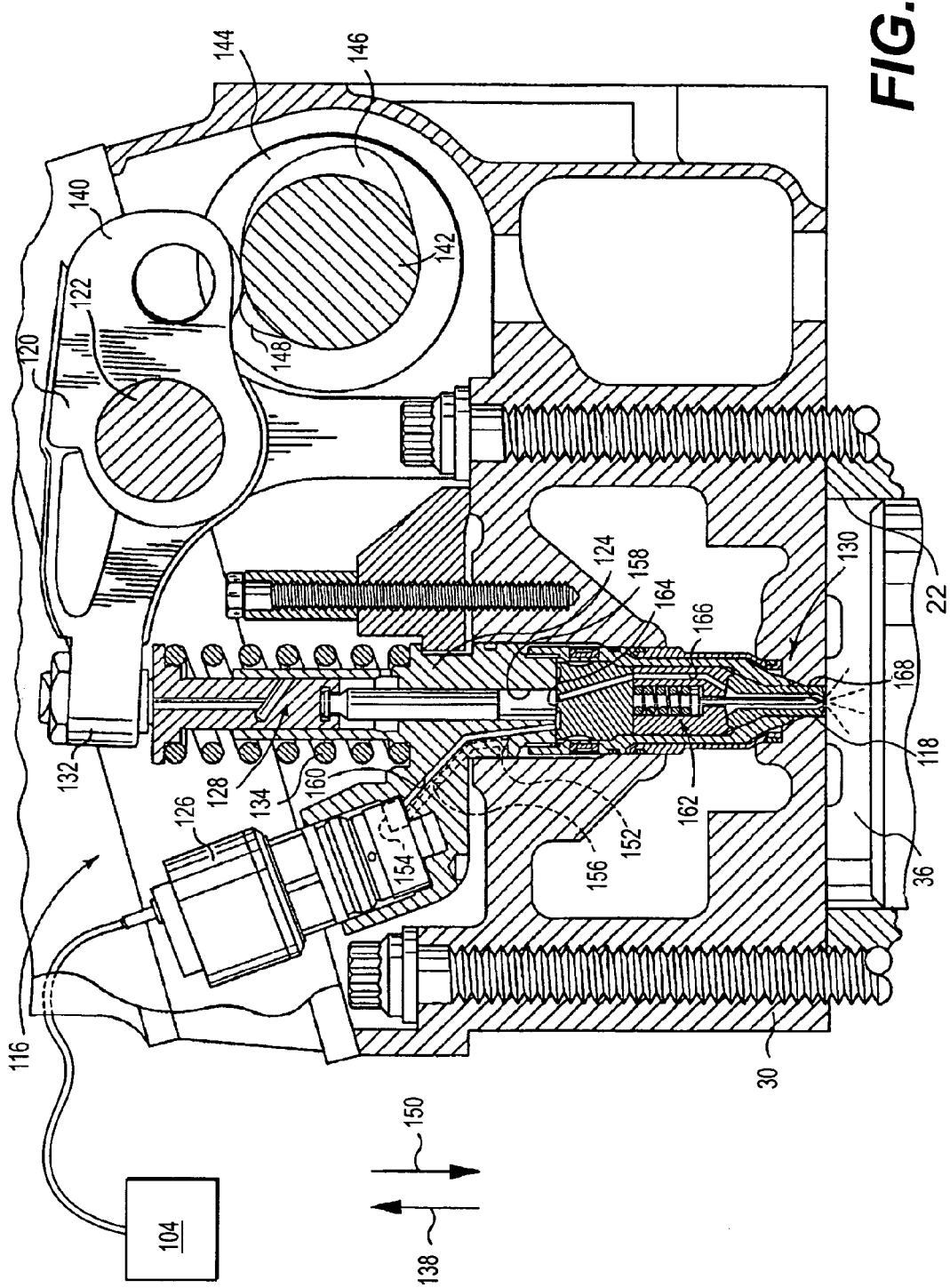
FIG. 5 is a cross-sectional illustration of an exemplary disclosed fuel injection assembly for the internal combustion engine of FIG. 1.

As illustrated in FIG. 5, internal combustion engine 12 may also include a fuel injector assembly 116 configured to inject fuel or otherwise spray fuel, for example, diesel fuel, directly into each combustion chamber 36 via a fuel port 118 within cylinder head 30 in accordance with a desired timing. Fuel injector assembly 116 may embody a mechanically-actuated, electronically-controlled unit injector, in fluid communication with a common fuel rail (not shown). Alternatively, fuel injector assembly 116 may be any common rail type injector and may be actuated and/or operated hydraulically, mechanically, electrically, piezo-electrically, or any combination thereof. The common fuel rail may provide fuel to the fuel injector assembly 116 associated with each combustion chamber 36. Fuel injector assembly 116 may be associated with an injector rocker arm 120 and pivotally coupled to a rocker shaft 122. Each fuel injector assembly 116 may include an injector body 124, a solenoid 126, a plunger assembly 128, and an injector tip assembly 130. A first end 132 of injector rocker arm 120 may be operatively coupled to plunger assembly 128. Plunger assembly 128 may be biased by a spring 134 toward the first end 132 of injector rocker arm 120 in the general direction of an arrow 138.

A second end 140 of injector rocker arm 120 may be operatively coupled to a camshaft 142. More specifically, camshaft 142 may include a cam lobe 144 having a first bump 146 and a second bump 148. Camshafts 74, 142 and their respective lobes 78, 144 may be combined into a single camshaft (not shown) if desired. First and second bumps 146, 148 may be moved into and out of contact with the second end 140 of injector rocker arm 120 during rotation of the camshaft 142. First and second bumps 146, 148 may be structured and arranged such that second bump 148 may provide a pilot injection of fuel at a predetermined crank angle before first bump 146 provides a main injection of fuel. It should be appreciated that cam lobe 144 may have only a first bump 146 that injects all of the fuel per cycle.

When one of first and second bumps 146, 148 is rotated into contact with injector rocker arm 120, the second end 140 of injector rocker arm 120 may be urged in the general direction of arrow 138. As the second end 140 is urged in the general direction of arrow 138, injector rocker arm 120 may pivot about rocker shaft 122 thereby causing the first end 132 to be urged in the general direction of an arrow 150. The force exerted on the second end 140 by first and second bumps 146, 148 may be greater in magnitude than the bias generated by spring 134, thereby causing plunger assembly 128 to be likewise urged in the general direction of arrow 150. When camshaft 142 is rotated beyond the maximum height of first and second bumps 146, 148, the bias of spring 134 may urge plunger assembly 128 in the general direction of arrow 138. As plunger assembly 128 is urged in the general direction of arrow 138, the first end 132 of injector rocker arm 120 is likewise urged in the general direction of arrow 138, which causes injector rocker arm 120 to pivot about rocker shaft 122, thereby causing the second end 140 to be urged in the general direction of arrow 150.

Injector body 124 may define a fuel port 152. Fuel, such as diesel fuel, may be drawn or otherwise aspirated into fuel port 152 from the fuel rail when plunger assembly 128 is moved in the general direction of arrow 138. Fuel port 152 may be in fluid communication with a fuel valve 154 via a first fuel channel 156. Fuel valve 154 may be, in turn, in fluid communication with a plunger chamber 158 via a second fuel channel 160.

Controller 104 may be configured to affect operation of fuel injector assembly 116. Specifically, solenoid 126 may be electrically coupled to controller 104 and mechanically coupled to fuel valve 154. Actuation of solenoid 126 by a signal from controller 104 may cause fuel valve 154 to be switched from an open position to a closed position. When fuel valve 154 is in its open position, fuel may advance from fuel port 152 to plunger chamber 158, and vice versa. However, when fuel valve 154 is in its closed positioned, fuel port 152 may be isolated from plunger chamber 158.

Injector tip assembly 130 may include a check valve assembly 162. Fuel may be advanced from plunger chamber 158, through an inlet orifice 164, a third fuel channel 166, an outlet orifice 168, and into cylinder 22 of internal combustion engine 12.

Thus, it should be appreciated that when one of first and second bumps 146, 148 is not in contact with injector rocker arm 120, plunger assembly 128 may be urged in the general direction of arrow 138 by spring 134, thereby causing fuel to be drawn into fuel port 152, which in turn fills plunger chamber 158 with fuel. As camshaft 142 is further rotated, one of first and second bumps 146, 148 may be moved into contact with injector rocker arm 120, thereby causing plunger assembly 128 to be urged in the general direction of arrow 150. If controller 104 is not generating an injection signal, fuel valve 154 may remain in its open position, thereby causing the fuel which is in plunger chamber 158 to be displaced by plunger assembly 128 through fuel port 152. However, if controller 104 is generating an injection signal, fuel valve 154 may be positioned in its closed position thereby isolating plunger chamber 158 from fuel port 152. As plunger assembly 128 continues to be urged in the general direction of arrow 150 by camshaft 142, fluid pressure within fuel injector assembly 116 may increase. At a predetermined pressure magnitude, for example, at about 5500 psi (38 MPa), fuel may be injected into combustion chamber 36. Fuel may continue to be injected into combustion chamber 36 until controller 104 signals solenoid 126 to return fuel valve 154 to its open position.

Figure 6:
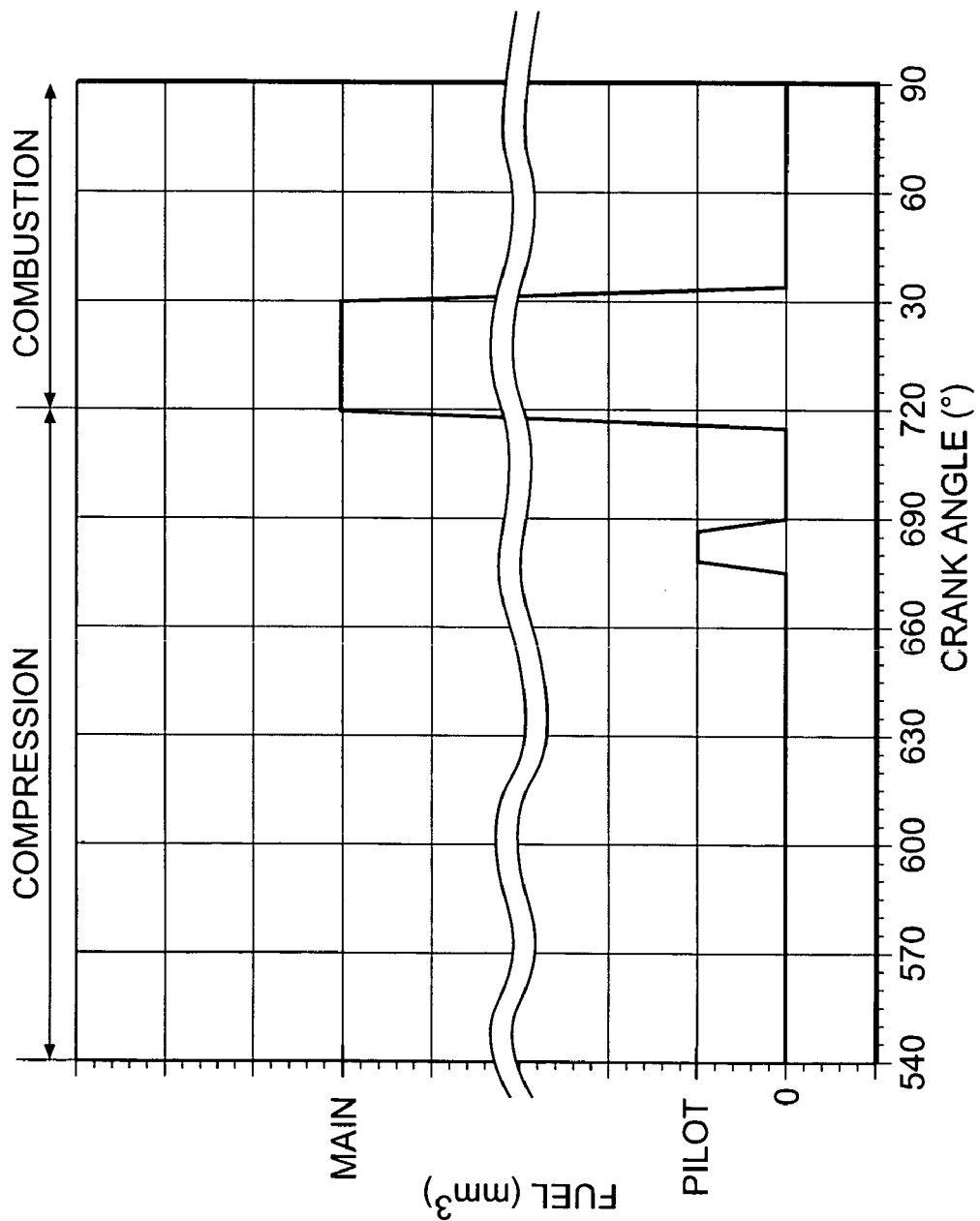
FIG. 6 is a graph illustrating exemplary disclosed fuel injections as functions of engine crank angle.

As shown in the exemplary graph of FIG. 6, the pilot injection of fuel may commence when crankshaft 26 is at about 675° crank angle, that is, about 45° before top dead center of the compression stroke. The main injection of fuel may occur when crankshaft 26 is at about 710° crank angle, that is, about 10° before top dead center of the compression stroke and about 45° after commencement of the pilot injection. Generally, the pilot injection may commence when crankshaft 26 is about 40–50° before top dead center of the compression stroke and may last for about 10–15° of crankshaft rotation. The main injection may commence when the crankshaft 26 is between about 10° before top dead center of the compression stroke and about 12° after top dead center of the combustion stroke. The main injection may last for about 20–45° of crankshaft rotation. The pilot injection may use a desired portion of the total fuel used, for example about 10%.

As illustrated in FIG. 1, air supply system 14 may include components that fluidly communicate with intake manifold 16 and the exhaust manifold 18. In particular, air supply system 14 may include a first turbocharger 170 and a second turbocharger 172. First and second turbochargers 170, 172 may be arranged in series with one another such that second turbocharger 172 provides a first stage of pressurization and first turbocharger 170 provides a second stage of pressurization. For example, second turbocharger 172 may be a low pressure turbocharger and first turbocharger 170 may be a high pressure turbocharger. First turbocharger 170 may include a turbine 174 and a compressor 176. Turbine 174 may be fluidly connected to exhaust manifold 18 via an exhaust duct 178 and may include a turbine wheel 180 carried by a shaft 182. Shaft 182 may be rotatably carried by a housing 184, for example, a single-part or multi-part housing. The fluid flow path from exhaust manifold 18 to turbine 174 may include a variable nozzle (not shown) or other variable geometry arrangement adapted to control the velocity of exhaust fluid impinging on turbine wheel 180. Compressor 176 may be fluidly connected to intake manifold 16 and may include a compressor wheel 186 carried by shaft 182. Thus, rotation of shaft 182 by turbine wheel 180 may cause rotation of compressor wheel 186.

First turbocharger 170 may include a compressed air duct 188 for receiving compressed air from the second turbocharger 172 and an air outlet line 190 for receiving compressed air from compressor 176 and supplying the compressed air to intake manifold 16 of the internal combustion engine 12. First turbocharger 170 may also include an exhaust duct 192 for receiving exhaust fluid from turbine 174 and supplying the exhaust fluid to second turbocharger 172.

Second turbocharger 172 may include a turbine 194 and a compressor 196. Turbine 194 may be fluidly connected to exhaust duct 192 and may include a turbine wheel 198 carried by a shaft 200, which in turn may be rotatably carried by housing 184. Compressor 196 may include a compressor wheel 202 also carried by shaft 200. Thus, rotation of shaft 200 by the turbine wheel 198 may in turn cause rotation of compressor wheel 202.

Second turbocharger 172 may include an air intake line 204 providing fluid communication between the atmosphere and compressor 196. Second turbocharger 172 may also supply compressed air to first turbocharger 170 via compressed air duct 188. Second turbocharger 172 may include an exhaust outlet 206 for receiving exhaust fluid from turbine 194 and providing fluid communication with the atmosphere. In an embodiment, first turbocharger 170 and second turbocharger 172 may be sized to provide substantially similar compression ratios. For example, first turbocharger 170 and second turbocharger 172 may both provide compression ratios of between 2:1 and 3:1, resulting in a system compression ratio of at least 4:1 with respect to atmospheric pressure. Alternatively, second turbocharger 172 may provide a compression ratio of 3:1 and first turbocharger 170 may provide a compression ratio of 1.5:1, resulting in a system compression ratio of 4.5:1 with respect to atmospheric pressure.

Air supply system 14 may include an air cooler 208, for example, an aftercooler, between compressor 176 and the intake manifold 16. Air cooler 208 may extract heat from the air to lower the intake manifold temperature and increase the air density. Optionally, air supply system 14 may include an additional air cooler 210, for example, an intercooler, between compressor 196 of the second turbocharger 172 and compressor 176 of the first turbocharger 170. Intercooling may use techniques such as jacket water, air to air, and the like. Alternatively, air supply system 14 may optionally include an additional air cooler (not shown) between air cooler 208 and the intake manifold 16. The optional additional air cooler may further reduce the intake manifold temperature. A jacket water pre-cooler (not shown) may be used to protect air cooler 208.

Figure 7:
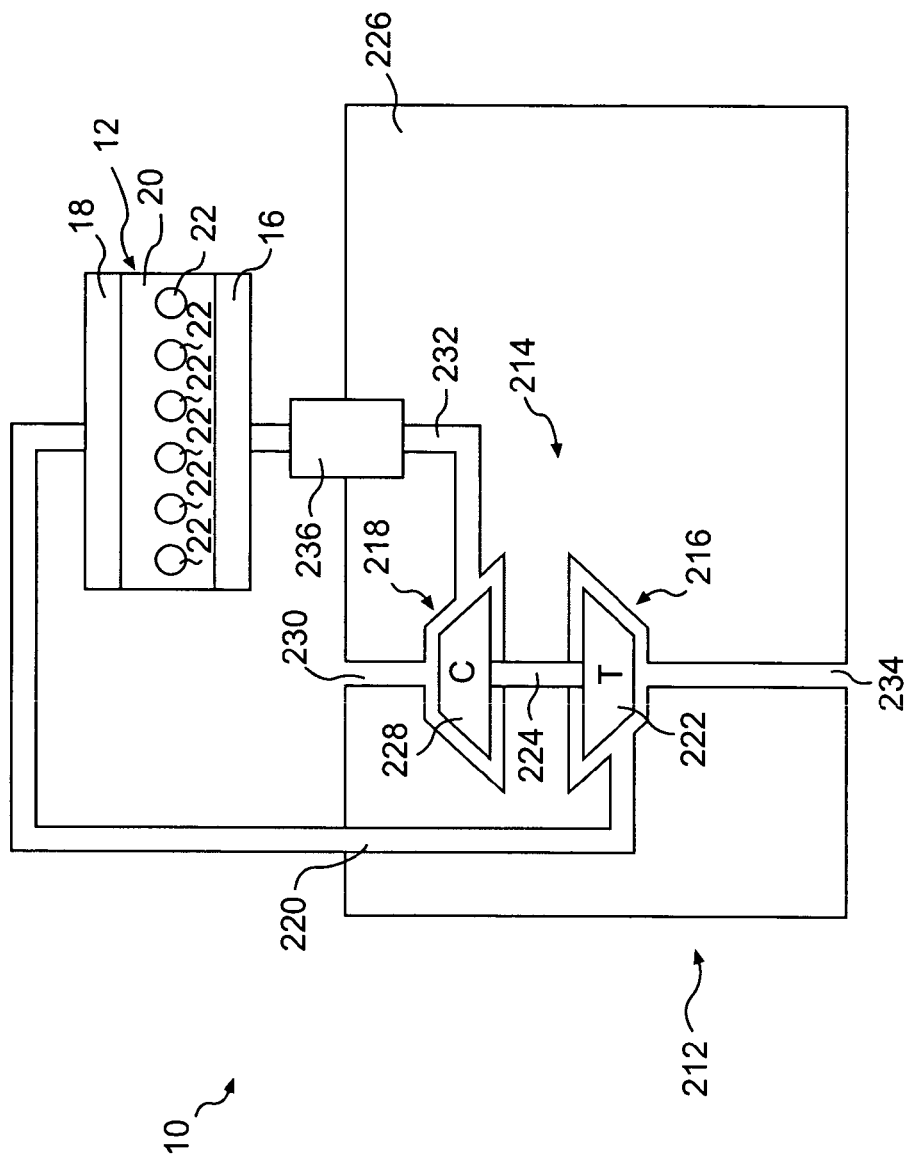
FIG. 7 is a diagrammatic illustration of another exemplary disclosed internal combustion engine having an air supply system.

FIG. 7 illustrates an alternate air supply system 212 for internal combustion engine 12. Air supply system 212 may include a turbocharger 214, for example, a high-efficiency turbocharger capable of producing at least about a 4:1 compression ratio with respect to atmospheric pressure. Turbocharger 214 may include a turbine 216 and a compressor 218. Turbine 216 may be fluidly connected to exhaust manifold 18 via an exhaust duct 220. Turbine 216 may include a turbine wheel 222 carried by a shaft 224, which in turn may be rotatably carried by a housing 226, for example, a single-part or multi-part housing. The fluid flow path from exhaust manifold 18 to the turbine 216 may include a variable nozzle (not shown), which may control the velocity of exhaust fluid impinging on the turbine wheel 222.

Compressor 218 may include a compressor wheel 228 carried by shaft 224. Thus, rotation of shaft 224 by the turbine wheel 222 in turn may cause rotation of compressor wheel 228. Turbocharger 214 may include an air inlet 230 providing fluid communication between the atmosphere and compressor 218 and an air outlet 232 for supplying compressed air to intake manifold 16 of internal combustion engine 12. Turbocharger 214 may also include an exhaust outlet 234 for receiving exhaust fluid from turbine 216 and providing fluid communication with the atmosphere.

Air supply system 212 may include an air cooler 236 between compressor 218 and the intake manifold 16. Optionally, air supply system 212 may include an additional air cooler (not shown) between air cooler 236 and intake manifold 16.

Figure 8:
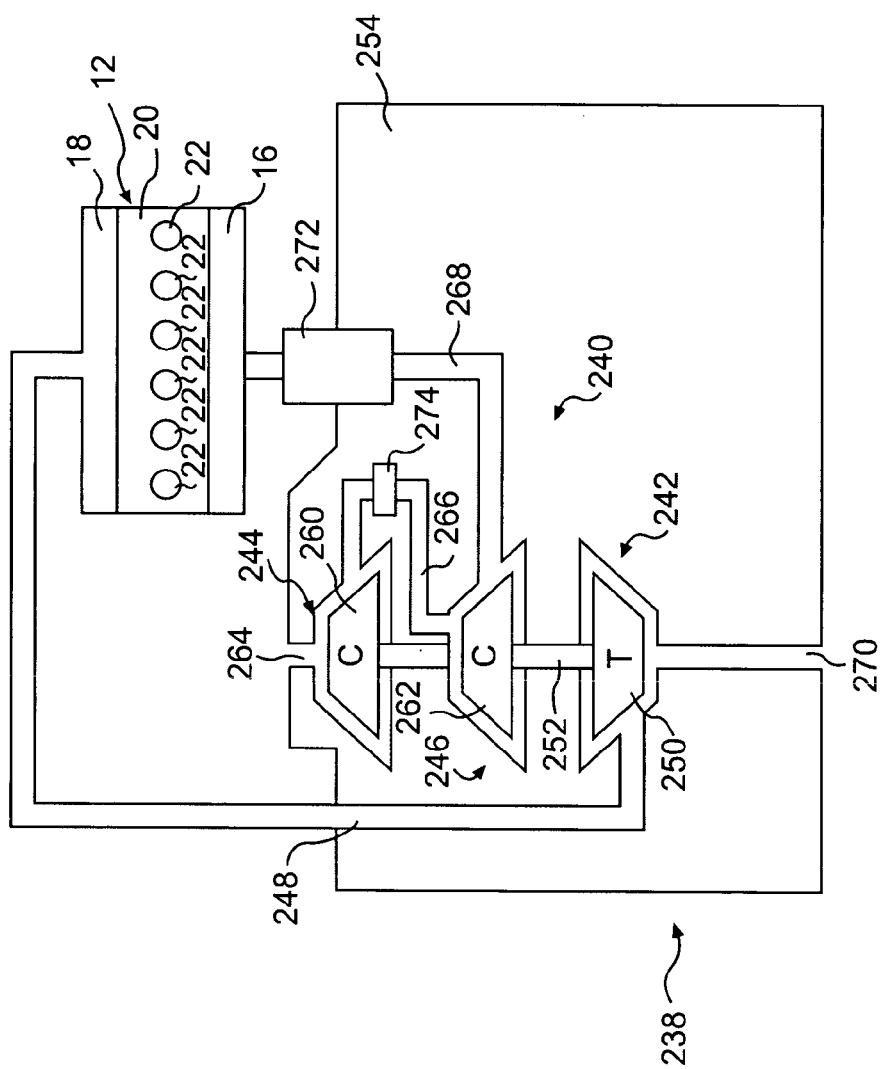
FIG. 8 is a diagrammatic illustration of another exemplary disclosed internal combustion engine having an air supply system.

FIG. 8 illustrates another alternate air supply system 238 for internal combustion engine 12. Air supply system 238 may include a turbocharger 240 having a turbine 242 and first and second compressors 244, 246. Turbine 242 may be fluidly connected to exhaust manifold 18 via an inlet duct 248. Turbine 242 may include a turbine wheel 250 carried by a shaft 252, which in turn may be rotatably carried by a housing 254, for example, a single-part or multi-part housing. The fluid flow path from exhaust manifold 18 to turbine 242 may include a variable nozzle (not shown), which may control the velocity of exhaust fluid impinging on the turbine wheel 250.

First compressor 244 may include a compressor wheel 260 carried by shaft 252, and second compressor 246 may include a compressor wheel 262 carried by shaft 252. Thus, rotation of shaft 252 by turbine wheel 250 in turn may cause rotation of first and second compressor wheels 260, 262. First and second compressors 244, 246 may provide first and second stages of pressurization, respectively.

Turbocharger 240 may include an air intake line 264 providing fluid communication between the atmosphere and first compressor 244 and a compressed air duct 266 for receiving compressed air from first compressor 244 and supplying the compressed air to second compressor 246. Turbocharger 240 may also include an air outlet line 268 for supplying compressed air from second compressor 246 to intake manifold 16 of internal combustion engine 12. Turbocharger 240 may further include an exhaust outlet 270 for receiving exhaust fluid from turbine 242 and providing fluid communication with the atmosphere.

For example, first compressor 244 and second compressor 246 may both provide compression ratios of between 2:1 and 3:1, resulting in a system compression ratio of at least 4:1 with respect to atmospheric pressure. Alternatively, second compressor 246 may provide a compression ratio of 3:1 and first compressor 244 may provide a compression ratio of 1.5:1, resulting in a system compression ratio of 4.5:1 with respect to atmospheric pressure.

Air supply system 238 may include an air cooler 272 between second compressor 246 and intake manifold 16. Optionally, air supply system 238 may include an additional air cooler 274 between first compressor 244 and second compressor 246 of turbocharger 240. Alternatively, air supply system 238 may optionally include an additional air cooler (not shown) between air cooler 272 and intake manifold 16.

Figure 9:
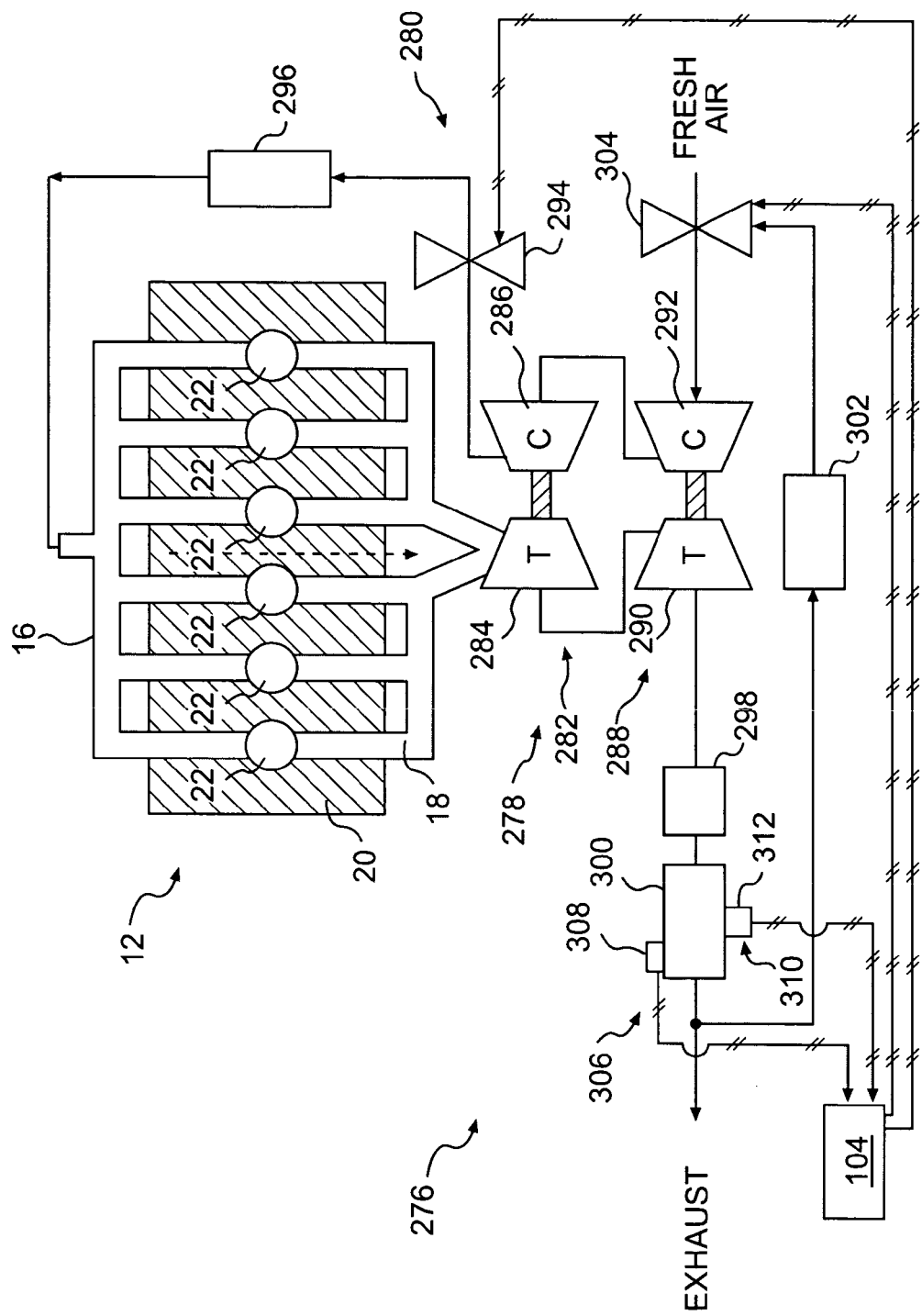
FIG. 9 is a diagrammatic illustration of another exemplary disclosed internal combustion engine having exhaust gas recirculation system.

FIG. 9 illustrates an exemplary exhaust gas recirculation (EGR) system 276 associated with an exhaust system 278 of internal combustion engine 12. In this embodiment, internal combustion engine 12 includes an air supply system 280 having two-stage turbocharging similar to air supply system 14 of FIG. 1. Air supply system 280 may include a first turbocharger 282 having a turbine 284 and a compressor 286. Air supply system 280 may also include second turbocharger 288 having turbine 290 and compressor 292. The two-stage turbocharger system operates to increase the pressure of the air and exhaust gases being delivered to cylinders 22 via intake manifold 16, and to maintain a desired air to fuel ratio during extended open durations of intake valves 52 of cylinders 22 (referring to FIG. 2). It is noted that a two-stage turbocharger system is not required for operation of the present invention. Other types of turbocharger systems, such as the high pressure ratio single-stage turbocharger system of FIG. 7, a variable geometry turbocharger system, and the like, may be used instead.

A throttle valve 294, may be located between compressor 286 and intake manifold 16 and used to control the amount of air and recirculated exhaust gases being delivered to cylinders 22. Although throttle valve 294 is shown between compressor 286 and an aftercooler 296, throttle valve 294 may be alternatively positioned at other locations such as, for example, after aftercooler 296.

Although EGR system 276 is a low pressure EGR system, variations of EGR system 276 may be equally used with the present invention, including both low pressure loop and high pressure loop EGR systems. Other types of EGR systems, such as for example by-pass, venturi, piston-pumped, peak clipping, and back pressure, could be used.

An oxidation catalyst 298 may receive exhaust gases from turbine 290 and serve to reduce HC emissions. Oxidation catalyst 298 may also be coupled with a de-NOx catalyst to further reduce oxides of nitrogen (NOx) emissions. A particulate matter (PM) filter 300 may receive exhaust gases from oxidation catalyst 298. Although oxidation catalyst 298 and PM filter 300 are shown as separate items, they may alternatively be combined into one package.

Some of the exhaust gases may be delivered to the atmosphere from PM filter 300, while a portion of the exhaust gases may be routed to intake manifold 16 through an EGR cooler 302, through an EGR valve 304, and through first and second turbochargers 282, 288. EGR cooler 302 may be of a type well known in the art, for example a jacket water or an air to gas heat exchanger type.

A means 306 for determining pressure within PM filter 300 is shown. In the preferred embodiment, the means 306 for determining pressure may include a pressure sensor 308. However, other alternate means 306 may be employed. For example, the pressure of the exhaust gases in PM filter 300 may be estimated from a model based on one or more parameters associated with internal combustion engine 12. Parameters may include, but are not limited to, engine load, engine speed, temperature, fuel usage, and the like.

A means 310 for determining flow of exhaust gases through PM filter 300 may be used. Preferably, means 310 for determining flow of exhaust gases may include a flow sensor 312. Flow sensor 312 may be used alone to determine pressure in PM filter 300 based on changes in flow of exhaust gases, or may be used in conjunction with pressure sensor 308 to provide more accurate pressure change determinations.

INDUSTRIAL APPLICABILITY

An air and fuel supply system for an internal combustion engine in accordance with the exemplary embodiments of the invention may extract additional work from the engine's exhaust. The system may achieve fuel efficiency and reduced NOx emissions, while maintaining work potential and ensuring that the system reliability meets with operator expectations. The operation of internal combustion engine 12 will now be explained.

Internal combustion engine 12 may function in a known manner using, for example, the diesel principle of operation. Internal combustion engine 12 may be used with each of the exemplary air supply systems 14, 212, 238, and 280 of FIGS. 1 and 7–9, respectively. Compressed air may be supplied from air supply systems 14, 212, 238, and 280 to combustion chambers 36 via intake port 42, and exhaust air may exit combustion chambers 36 to air supply systems 14, 212, 238, and 280 via exhaust port 38. Intake valve 52 and exhaust valve 46 may be controllably moved to direct airflow into and exhaust out of combustion chambers 36.

In a conventional Otto or diesel cycle mode, intake valve 52 may move from the second or closed position to the first or open position in a cyclical fashion to allow compressed air to enter combustion chamber 36 of cylinder 22 at or near top dead center of the intake stroke (about 360° crank angle), as shown in FIG. 4. At or near bottom dead center of the compression stroke (about 540° crank angle), intake valve 52 may move from the first position to the second position to block additional air from entering combustion chamber 36. Fuel may then be injected from fuel injector assembly 116 (referring to FIG. 5) at or near top dead center of the compression stroke (about 720° crank angle).

In accordance with the Miller cycle, the Otto or diesel cycle may be modified by moving intake valve 52 from the first position to the second position at either some predetermined time before bottom dead center of the intake stroke (i.e., before 540° crank angle) or some predetermined time after bottom dead center of the compression stroke (i.e., after 540° crank angle). In a late-closing Miller cycle, intake valve 52 may be moved from the first position to the second position during a first portion of the first half of the compression stroke.

Variable valve closing mechanism 92 may enable internal combustion engine 12 to be operated in an early-closing Miller cycle, a late-closing Miller cycle, and a conventional Otto or diesel cycle. Further, injecting a substantial portion of fuel after top dead center of the combustion stroke, as illustrated in FIG. 6, may reduce NOx emissions and increase the amount of energy rejected to exhaust manifold 18 in the form of exhaust fluid. Use of a high-efficiency turbocharger 214, 240 or series turbochargers 170–172, 282–288 may enable recapture of at least a portion of the rejected energy from the exhaust. The rejected energy may be converted into increased air pressures delivered to the intake manifold 16, which may increase the energy pushing piston 24 against crankshaft 26 to produce useable work. In addition, delaying movement of intake valve 52 from the open position to the closed position may reduce the compression temperature in combustion chamber 36. The reduced compression temperature may further reduce NOx emissions.

Controller 104 may operate variable valve closing mechanism 92 to vary the timing of intake valve 52 to achieve desired engine performance based on one or more engine conditions, for example, engine speed, engine load, engine temperature, boost, and/or manifold intake temperature. Variable valve closing mechanism 92 may also allow more precise control of the air/fuel ratio. By delaying closing of intake valve 52, controller 104 may control the cylinder pressure during the compression stroke of piston 24. For example, late closing of intake valve 52 may reduce the compression work that piston 24 must perform without compromising cylinder pressure and while maintaining a standard expansion ratio and a suitable air/fuel ratio.

The following discussion describes the implementation of a late intake Miller cycle in a single cylinder 22 of internal combustion engine 12. One skilled in the art will recognize that the system of the present invention may be used to selectively implement a late intake Miller cycle in all cylinders 22 of internal combustion engine 12 in the same or a similar manner. In addition, the disclosed system may be used to implement other valve actuation variations on the conventional diesel cycle, such as, for example, an exhaust Miller cycle, an early closing Miller cycle, and other variations known in the art.

When internal combustion engine 12 is operating under normal operating conditions, controller 104 may implement a late intake Miller cycle by applying a first current to solenoid coil 96 during a first portion of the compression stroke of piston 24. The current may generate a magnetic field at solenoid coil 96 that forces armature 98 and core 100 to an extended position in a first direction. For example, solenoid coil 96 may attract armature 98 and core 100 in a direction toward solenoid coil 96 such that end 102 of core 100 engages first end 60 of rocker arm 58 to hold intake valve 52 open for a first portion of the compression stroke of piston 24.

In an exemplary embodiment, electromagnetic actuator 94 may be a latching solenoid. In such an embodiment, armature 98 and core 100 may remain in the extended position even when the first current is no longer applied to solenoid coil 96. When it is desired to allow intake valve 52 to close, a second current may be applied to solenoid coil 96 in a direction opposite to the first current. The second current may generate a magnetic field at solenoid coil 96 that forces armature 98 and core 100 to a retracted position in a second direction, opposite to the first direction. For example, solenoid coil 96 may repel armature 98 and core 100 in a direction away from the solenoid coil 96 such that the end 102 of core 100 no longer engages first end 60 of rocker arm 58 and allows intake valve 52 to close.

It should be appreciated that an additional current could be applied to solenoid coil 96 as the force of valve spring 68 begins to close intake valve 52 so as to reduce the impact force of head 56 on valve seat 72. This additional current may have a value between the first and second currents. The additional current may return armature 98 and core 100 toward the extended position and may retain armature 98 and core 100 in an extended position.

An exemplary late intake closing of intake valve 52 is illustrated in FIG. 4. As shown, intake valve 52 may be extended past a conventional closing 314 into a portion of the compression stroke of piston 24 during a late closing 316. This allows some of the air in combustion chamber 36 to escape, thereby changing a compression ration of internal combustion engine 12. The amount of air allowed to escape the combustion chamber 36 may determine the compression ratio of internal combustion engine 12 and may be controlled by adjusting the crank angle at which the first current is applied to the solenoid coil 96 of the electromagnetic actuator 94. The first current may be applied to solenoid coil 96 at an earlier crank angle to decrease the amount of escaping air or at a later crank angle to increase the amount of escaping air.

Electromagnetic actuator 94 may also be actuated to reduce the velocity at which intake valves 52 are closed. This may prevent head 56 of intake valve 52 from being damaged when closing against valve seat 72. For example, regardless of whether controller 104 is implementing a late intake Miller cycle or a conventional diesel cycle, a current may be applied to solenoid coil 96 at a time when intake valve 52 is closing. For example, during a late intake Miller cycle, this current is applied after the previously described first and second currents are applied. The current generates a magnetic field at solenoid coil 96 that forces armature 98 and core 100 to the extended position in the first direction to engage first end 60 of rocker arm 58. The force of the magnetic field may be strong enough to stop the closing of intake valve 52, but not so strong as to cause damage to valve stem 54 or rocker arm 58. A reverse current may be applied shortly thereafter to allow intake valve 52 to continue closing without significant delay, while slowing the closing momentum of intake valve 52 to reduce the impact of head 56 against valve seat 72. The effect of the current for reducing intake valve closing velocity can be seen from the gradual taper of the late intake closing curve 316 as the compression stroke of piston 24 approaches top dead center.

It should be appreciated that other alternatives exist for reducing the closing speed of intake valve 52. For example, an impact absorber (not shown) may be placed between core 100 and rocker arm 58. The impact absorber may include a spring/damper element, for example, a self-contained hydraulic, pneumatic, or elastomeric element. As another example, a cam (not shown) may be used to reduce the closing speed of intake valve 52. Such a cam may be referred to as a "decelerating" or "handoff" cam because it reduces the closing speed of intake valve 52 at the handoff or impact point.

The disclosed engine valve actuation system may selectively alter the timing of the intake and/or exhaust valve actuation of an internal combustion engine. The actuation of the engine valves may be based on sensed operating conditions of the engine. For example, the engine valve actuation system may implement a late intake Miller cycle when the engine is operating under normal operating conditions, and the late intake Miller cycle may be disengaged when the engine is operating under other conditions. The engine valve actuation system may be used to implement late intake Miller cycle during cold engine start and other cold engine conditions, since the operational reliability of the electromagnetic actuator 94 is not as dependent on operating temperature as a hydraulically operated system might be. Thus, the present invention provides a flexible engine valve actuation system that provides for both enhanced cold starting capability and fuel efficiency gains.

The high pressure air provided by the exemplary air supply systems 14, 212, 238, and 280 may provide extra boost on the induction stroke of piston 24. The high pressure may also enable intake valve 52 to be closed even later than in a conventional Miller cycle engine. In the present invention, intake valve 52 may remain open until the second half of the compression stroke of piston 24, for example, as late as about 80° to 70° before top dead center (BTDC). While intake valve 52 is open, air may flow between combustion chamber 36 and intake manifold 16. Thus, cylinder 22 experiences less of a temperature rise in combustion chamber 36 during the compression stroke of piston 24.

Since the closing of intake valve 52 may be delayed, the timing of fuel injection may also be retarded. For example, controller 104 may controllably operate fuel injector assembly 116 to supply fuel to combustion chamber 36 after intake valve 52 is closed. For example, fuel injector assembly 116 may be controlled to supply a pilot injection of fuel contemporaneous with or slightly after intake valve 52 is closed and to supply a main injection of fuel contemporaneous with or slightly before combustion temperature is reached within combustion chamber 36. As a result, a significant amount of exhaust energy may be available for recirculation by a air supply systems 14, 212, 238, and 280, which may efficiently extract additional work from the exhaust energy.

Referring to the exemplary air supply system 14 of FIG. 1, exhaust gas from internal combustion engine 12 may be directed from exhaust manifold 18 through exhaust duct 178 to impinge on and causes rotation of turbine wheel 180 of first turbocharger 170. Because turbine wheel 180 is coupled with shaft 182, which in turn carries compressor wheel 186, the rotational speed of compressor wheel 186 may correspond to the rotational speed of turbine wheel 180. Second turbocharger 172 may extract otherwise wasted energy from the exhaust stream of first turbocharger 170 to turn compressor wheel 202 of second turbocharger 172, which is in series with compressor wheel 186 of first turbocharger 170. The extra restriction in the exhaust path resulting from the addition of second turbocharger 172 may raise the back pressure on piston 24. However, the energy recovery accomplished through the use of second turbocharger 172 may offset the work consumed by the higher back pressure. For example, the additional pressure achieved by the series turbochargers 170,172 may do work on piston 24 during the intake stroke of the combustion cycle. Further, the added pressure on cylinder 22 resulting from second turbocharger 172 may be controlled and/or relieved by using the late intake valve closing. Thus, the series turbochargers 170, 172 may provide fuel efficiency via air supply system 14, and not simply more power.

It should be appreciated that air coolers 208, 236, 272, and 296 (referring to FIGS. 1 and 7–9) of air supply systems 14, 212, 238, and 280, preceding the intake manifold 16 may extract heat from the air to lower the inlet manifold temperature, while maintaining the denseness of the pressurized air. The optional additional air coolers 210, 274 between compressors 176 and 196, and 244 and 246 or after air coolers 208, 236, 272, and 296 may further reduce the inlet manifold temperature, but may lower the work potential of the pressurized air. The lower inlet manifold temperature may further reduce NOx emissions.

Referring to FIG. 9, a change in pressure of exhaust gases passing through PM filter 300 may result from an accumulation of particulate matter, thus indicating a need to regenerate PM filter 300 (i.e., burn away the accumulation of particulate matter). For example, as particulate matter accumulates, pressure in PM filter 300 may increase.

PM filter 300 may be a catalyzed diesel particulate filter (CDPF) or an active diesel particulate filter (ADPF). A CDPF allows soot to burn at much lower temperatures. An ADPF is defined by raising the PM filter internal energy by means other than internal combustion engine 12, for example electrical heating, burner, fuel injection, and the like.

One method to increase the exhaust temperature and initiate PM filter regeneration is to use throttle valve 294 to restrict inlet air, thus increasing exhaust temperature. Other methods to increase exhaust temperature may include variable geometry turbochargers, smart wastegates, variable valve actuation, and the like. Yet another method to increase exhaust temperature and initiate PM filter regeneration may include the use of a post injection of fuel ( i.e., a fuel injection timed after delivery of a main injection).

Throttle valve 294 may be coupled to EGR valve 304 so that they are both actuated together. Alternatively, throttle valve 294 and EGR valve 304 may be actuated independently of each other. Both valves may operate together or independently to modulate the rate of EGR being delivered to intake manifold 16.

CDPFs regenerate more effectively when the ratio of NOx, to particulate matter (i.e., soot) is within a certain range, for example, from about 20:1 to about 30:1. It has been found, however, that an EGR system combined with the above described methods of multiple fuel injections and variable valve timing may result in a NOx, to soot ratio of about 10:1. Thus, it may be desirable to periodically adjust the levels of emissions to change the NOx to soot ratio to a more desired range and then initiate regeneration. Examples of methods which may be used include adjusting the EGR rate and adjusting the timing of main fuel injection.

A venturi (not shown) may be used at the EGR entrance to the fresh air inlet. The venturi would depress or lower the pressure of the fresh air at the inlet, thus allowing EGR to flow from the exhaust to the intake side. The venturi may include a diffuser portion which would restore the fresh air to near original velocity and pressure prior to entry into compressor 292. The use of a venturi and diffuser may increase engine efficiency.

It will be apparent to those skilled in the art that various modifications and variations can be made in the disclosed engine valve actuation system without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A method of operating an internal combustion engine including at least one cylinder and a piston slidable in the cylinder, the method comprising:
   supplying pressurized air from an intake manifold to an air intake port of a combustion chamber in the cylinder;
   operating an air intake valve to open the air intake port to allow pressurized air to flow between the combustion chamber and the intake manifold substantially during a majority portion of a compression stroke of the piston; and
   controlling an electromagnetic actuator to close the air intake port to prohibit pressurized air from flowing between the combustion chamber and the intake manifold, wherein the controlling includes applying a first current to a solenoid coil of the electromagnetic actuator to move a coupled armature and core of the electromagnetic actuator from a first position to a second position to engage a rocker arm operably coupled with the air intake valve.

2. The method of claim 1, wherein the controlling of the electromagnetic actuator is based on at least one engine condition.

3. The method of claim 1, further including controlling a fuel supply system to inject fuel into the combustion chamber.

4. The method of claim 3, further including injecting at least a portion of the fuel during a portion of the compression stroke.

5. The method of claim 4, wherein injecting at least a portion of the fuel includes supplying a pilot injection at a predetermined crank angle before a main injection.

6. The method of claim 5, wherein said main injection begins during the compression stroke.

7. The method of claim 1, further including cooling the pressurized air prior to supplying the pressurized air to the air intake port.

8. The method of claim 1, wherein said supplying includes supplying a mixture of pressurized air and recirculated exhaust gas from the intake manifold to the air intake port, and wherein said operating of the air intake valve includes operating the air intake valve to open the air intake port to allow the pressurized air and exhaust gas mixture to flow between the combustion chamber and the intake manifold substantially during a majority portion of the compression stroke of the piston.

9. The method of claim 8, wherein said supplying a mixture of pressurized air and recirculated exhaust gas includes providing a quantity of exhaust gas from an exhaust gas recirculation (EGR) system.

10. The method of claim 1, further including controlling the electromagnetic actuator to maintain the air intake port open to allow pressurized air to flow between the combustion chamber and the intake manifold.

11. The method of claim 1, wherein the moving further includes applying a second current to the solenoid coil to move the coupled armature and core from the second position to the first position to disengage from the rocker arm, the second current being opposite the first current.

12. The method of claim 11, wherein the moving further includes applying a third current to the solenoid coil to move the coupled armature and core from the first position to the second position to engage the rocker arm to slow a closing of the air intake valve.

13. The method of claim 1, further including selectively mechanically linking a cam to the air intake valve to move the air intake valve between a first position at which the pressurized air flows through the air intake port and a second position at which the air intake valve blocks the flow of pressurized air through the air intake port; and
   controlling the electromagnetic actuator to decouple the mechanical link between the cam and the air intake valve.

14. An internal combustion engine, comprising:
   an engine block defining at least one cylinder;
   a head connected with said engine block, the head including an air intake port and an exhaust port;
   a piston slidable in the cylinder;
   a combustion chamber being defined by said head, said piston, and said cylinder;
   an air intake valve movable to open and close the air intake port;
   an air supply system including at least one turbocharger fluidly connected to the air intake port;
   a fuel supply system operable to inject fuel into the combustion chamber;
   a cam assembly selectively mechanically linked to the air intake valve to move the air intake valve;
   a pivotable rocker arm operably coupling the cam assembly with the intake valve; and
   an electromagnetic actuator configured to decouple the cam assembly from the air intake valve and control movement of the air intake valve, wherein the electromagnetic actuator is configured to selectively engage the rocker arm.

15. The engine of claim 14, wherein the electromagnetic actuator is configured to keep the air intake valve open during at least a portion of a compression stroke of the piston.

16. The engine of claim 15, wherein the electromagnetic actuator is configured to keep the air intake valve open for a portion of a second half of the compression stroke.

17. The engine of claim 14, wherein the electromagnetic actuator is configured to close the intake valve before bottom dead center of an intake stroke of the piston.

18. The engine of claim 14, wherein the at least one turbocharger includes a first turbine coupled with a first compressor, the first turbine being in fluid communication with the exhaust port, the first compressor being in fluid communication with the air intake port; and wherein the air supply system further includes a second compressor being in fluid communication with atmosphere and the first compressor.

19. The engine of claim 14, wherein the at least one turbocharger includes a first turbocharger and a second turbocharger, the first turbocharger including a first turbine coupled with a first compressor, the first turbine being in fluid communication with the exhaust port and an exhaust duct, the first compressor being in fluid communication with the air intake port, the second turbocharger including a second turbine coupled with a second compressor, the second turbine being in fluid communication with the exhaust duct of the first turbocharger and atmosphere, and the second compressor being in fluid communication with atmosphere and the first compressor.

20. The engine of claim 14, further including an exhaust gas recirculation (EGR) system operable to provide a portion of exhaust gas from the exhaust port to the air supply system.

21. The engine of claim 14, wherein the electromagnetic actuator is a latching solenoid.

22. The engine of claim 21, wherein the electromagnetic actuator includes a solenoid coil and an armature coupled with a core, the armature and the core being movable together relative to the solenoid coil.

23. A method of operating an internal combustion engine including at least one cylinder and a piston slidable in the cylinder, the method comprising:
  imparting rotational movement to a first turbine and a first compressor of a first turbocharger with exhaust air flowing from an exhaust port of the cylinder;
  imparting rotational movement to a second turbine and a second compressor of a second turbocharger with exhaust air flowing from an exhaust duct of the first turbocharger;
  compressing air drawn from atmosphere with the second compressor;
  compressing air received from the second compressor with the first compressor;
  supplying pressurized air from the first compressor to an air intake port of a combustion chamber in the cylinder via an intake manifold;
  operating a fuel supply system to inject fuel directly into the combustion chamber;
  operating a cam that is selectively mechanically linked to the air intake valve to move the air intake valve; and
  operating an electromagnetic actuator to control movement of the air intake valve, wherein the operating includes applying a first current to a solenoid coil of the electromagnetic actuator to move a coupled armature and core of the electromagnetic actuator from a first position to a second position to engage a rocker arm operably coupled with the air intake valve.

24. The method of claim 23, wherein fuel is injected during a combustion stroke of the piston.

25. The method of claim 24, wherein fuel injection begins during a compression stroke of the piston.

26. The method of claim 23, wherein said operating an electromagnetic actuator includes operating the electromagnetic actuator to keep open the air intake valve to allow pressurized air to flow between the combustion chamber and the intake manifold during a portion of a compression stroke of the piston.

27. The method of claim 26, wherein said operating an electromagnetic actuator includes operating the electromagnetic actuator to keep open the air intake valve for a portion of a second half of a compression stroke of the piston.

28. The method of claim 23, wherein said operating an electromagnetic actuator includes closing the air intake valve before bottom dead center of an intake stroke of the piston.

29. The method of claim 23, further including operating the cam to move the air intake valve and cyclically open and close the air intake port, wherein said operating the electromagnetic actuator includes interrupting the cyclical opening and closing of the air intake port.

30. The method of claim 23, wherein operation of the electromagnetic actuator is based on at least one engine condition.

31. The method of claim 23, wherein said first and second compressors compress a mixture of air and recirculated exhaust gas, and wherein said supplying includes supplying the compressed mixture of pressurized air and recirculated exhaust gas to said intake port via said intake manifold.

32. The method of claim 23, wherein operating an electromagnetic actuator further includes applying a second current to the solenoid coil to move the coupled armature and core to disengage from the rocker arm, the second current being opposite the first current.

33. The method of claim 32, wherein operating an electromagnetic actuator further includes applying a third current to the solenoid coil to move the coupled armature and core to engage the rocker arm to slow a closing of the air intake valve.

34. A method of controlling an internal combustion engine having a variable compression ratio, said engine including a block defining a cylinder, a piston slidable in said cylinder, and a head connected with said block, said piston, said cylinder, and said head defining a combustion chamber, the method comprising:
  pressurizing air;
  supplying said air to an intake manifold of the engine;
  maintaining fluid communication between said combustion chamber and the intake manifold during a portion of an intake stroke and through a portion of a compression stroke;
  injecting fuel directly into the combustion chamber; and
  controlling the communication between said combustion chamber and the intake manifold at least in part by an electromagnetic actuator, wherein the controlling includes applying a first current to a solenoid coil of the electromagnetic actuator to move a coupled armature and core of the electromagnetic actuator from a first position to a second position to engage a rocker arm operably coupled with an air intake valve.

35. The method of claim 34, wherein said injecting fuel includes injecting fuel directly to the combustion chamber during a portion of a combustion stroke of the piston.

36. The method of claim 34, wherein said injecting fuel includes injecting fuel directly to the combustion chamber during a portion of the compression stroke.

37. The method of claim 34, wherein said injecting includes supplying a pilot injection at a predetermined crank angle before a main injection.

38. The method of claim 34, wherein said portion of the compression stroke is at least a majority of the compression stroke.

39. The method of claim 34, wherein said pressurizing includes a first stage of pressurization and a second stage of pressurization.

40. The method of claim 39, further including cooling air between said first stage of pressurization and said second stage of pressurization.

41. The method of claim 34, further including cooling the pressurized air.

42. The method of claim 34, wherein the pressurizing includes pressurizing a mixture of air and recirculated exhaust gas, and wherein the supplying includes supplying the pressurized air and exhaust gas mixture to the intake manifold.

43. The method of claim 42, further including cooling the pressurized air and exhaust gas mixture.

44. The method of claim 34, further including operating the electromagnetic actuator to varying a closing time of the air intake valve.

45. The method of claim 34, wherein the moving further includes applying a second current to the solenoid coil to move the coupled armature and core from the second position to the first position to disengage from the rocker arm, the second current being opposite the first current.

46. The method of claim 45, wherein the moving further includes applying a third current to the solenoid coil to move the coupled armature and core from the first position to the second position to engage the rocker arm to slow a closing of the air intake valve.

47. The method of claim 34, further including controlling the communication between said combustion chamber and the intake manifold at least in part by a cam assembly.

48. A method of operating an internal combustion engine including at least one cylinder and a piston slidable in the cylinder, the method comprising:
supplying pressurized air from an intake manifold to an air intake port of a combustion chamber in the cylinder;
operating an air intake valve to open the air intake port to allow pressurized air to flow between the combustion chamber and the intake manifold substantially during a portion of a compression stroke of the piston;
injecting fuel into the combustion chamber after the intake valve is closed, wherein the injecting includes supplying a pilot injection of fuel at a crank angle before a main injection of fuel; and
operating an electromagnetic actuator to control movement of the air intake valve, wherein the operating includes applying a first current to a solenoid coil of the electromagnetic actuator to move a coupled armature and core of the electromagnetic actuator from a first position to a second position to engage a rocker arm operably coupled with the air intake valve.

49. The method of claim 48, wherein at least a portion of the main injection occurs during a combustion stroke of the piston.

50. The method of claim 48, further including cooling the pressurized air prior to supplying the pressurized air to the air intake port.

51. The method of claim 48, wherein said supplying includes supplying a mixture of pressurized air and recirculated exhaust gas from the intake manifold to the air intake port, and wherein said operating the air intake valve includes operating the air intake valve to open the air intake port to allow the pressurized air and exhaust gas mixture to flow between the combustion chamber and the intake manifold substantially during a majority portion of the compression stroke of the piston.

52. The method of claim 51, wherein said supplying a mixture of pressurized air and recirculated exhaust gas includes providing a quantity of exhaust gas from an exhaust gas recirculation (EGR) system.

53. The method of claim 48, wherein the moving further includes applying a second current to the solenoid coil to move the coupled armature and core from the second position to the first position to disengage from the rocker arm, the second current being opposite the first current.

54. The method of claim 53, wherein the moving further includes applying a third current to the solenoid coil to move the coupled armature and core from the first position to the second position to engage the rocker arm to slow a closing of the air intake valve.

55. The method of claim 48, further including selectively mechanically linking a cam to the air intake valve to move the air intake valve between a first position at which the pressurized air flows through the air intake port and a second position at which the air intake valve blocks the flow of pressurized air through the air intake port; and
controlling the electromagnetic actuator to decouple the mechanical link between the cam and the air intake valve.

* * * * *